US011829651B2

(12) United States Patent
Liu et al.

(10) Patent No.: US 11,829,651 B2
(45) Date of Patent: *Nov. 28, 2023

(54) METHODS AND SYSTEMS FOR THE MOVEMENT OF METADATA BETWEEN DIFFERENT STORAGE TYPES

(71) Applicant: Veritas Technologies LLC, Santa Clara, CA (US)

(72) Inventors: Jialun Liu, Shoreview, MN (US); Xianbo Zhang, Plymouth, MN (US); Weibao Wu, Vadnais Heights, MN (US)

(73) Assignee: VERITAS TECHNOLOGIES LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,201

(22) Filed: Jan. 23, 2023

(65) Prior Publication Data

US 2023/0161513 A1     May 25, 2023

Related U.S. Application Data

(63) Continuation of application No. 16/953,432, filed on Nov. 20, 2020, now Pat. No. 11,561,728.

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/067* (2013.01); *G06F 3/0629* (2013.01); *G06F 3/0644* (2013.01)

(58) Field of Classification Search
USPC ....................................................... 711/154
See application file for complete search history.

(56) References Cited

U.S. PATENT DOCUMENTS

| 9,940,028 B2 * | 4/2018 | Tomlin .................. G06F 3/0688 |
| 10,515,055 B2 | 12/2019 | Ramesh et al. |
| 11,561,728 B1 | 1/2023 | Liu et al. |
| 2014/9073141 | 3/2019 | Brennan et al. |

\* cited by examiner

*Primary Examiner* — Mardochee Chery
(74) *Attorney, Agent, or Firm* — Campbell Stephenson LLP

(57) ABSTRACT

Methods, computer program products, computer systems, and the like for efficient metadata management are disclosed, which can include determining whether a change in a status of data has occurred. In response to a determination that the change has occurred, such methods, computer program products, and computer systems can include determining whether a move condition has been met, and, in response to a determination that the move condition has been met, moving the metadata from the first storage unit to a second storage unit.

20 Claims, 16 Drawing Sheets

METHODS AND SYSTEMS FOR THE MOVEMENT OF METADATA BETWEEN DIFFERENT STORAGE TYPES

CROSS-REFERENCE TO RELATED APPLICATIONS

The present patent application is a continuation of U.S. Pat. No. 11,561,728, filed on Nov. 20, 2020, entitled "METHODS AND SYSTEMS FOR EFFICIENT METADATA MANAGEMENT", issued on Jan. 24, 2023, and having J. Liu, X. Zhang, and W. Wu as inventors, which is incorporated by reference herein in its entirety and for all purposes.

FIELD OF THE INVENTION

The present disclosure relates to storage systems, and more specifically, to methods and systems for efficient metadata management.

BACKGROUND

An ever-increasing reliance on information and computing systems that produce, process, distribute, and maintain such information in its various forms, continues to put great demands on techniques for providing data storage and access to that data storage. Business organizations can produce and retain large amounts of data. While data growth is not new, the pace of data growth has become more rapid, the location of data more dispersed, and linkages between data sets more complex. Data deduplication offers business organizations an opportunity to dramatically reduce an amount of storage required for data backups and other forms of data storage and to more efficiently communicate backup data to one or more backup storages sites.

Generally, a data deduplication system provides a mechanism for storing a unit of information only once. Thus, in a backup scenario, if a unit of information is stored in multiple locations within an enterprise, only one copy of that unit of information will be stored in a deduplicated backup storage volume. Similarly, if the unit of information does not change during a subsequent backup, another copy of that unit of information need not be stored, so long as that unit of information continues to be stored in the deduplicated backup storage volume. Data deduplication can also be employed outside of the backup context, thereby reducing the amount of information needing to be transferred and the active storage occupied by duplicate units of information. As will be appreciated, reducing unwanted overhead in the transfer of data in such systems is desirable, from a data communication and storage perspective, among others.

SUMMARY

The present disclosure describes methods, computer program products, computer systems, and the like that provide for storage network configuration and maintenance in an efficient and effective manner. Such methods, computer program products, and computer systems include determining whether a change in a status of data has occurred. In response to a determination that the change has occurred, such methods, computer program products, and computer systems can include determining whether a move condition has been met, and, in response to a determination that the move condition has been met, moving the metadata from the first storage unit to a second storage unit. The data is stored in a storage system that comprises a plurality of storage units, the status is based (at least in part) on a characteristic of the data, metadata for the data is stored in a first storage unit of the plurality of storage units, the first storage unit is of one storage type, the one storage type is one of a first storage type of a plurality of storage types or a second storage type of the plurality of storage types, a storage unit of the first storage type comprises a first plurality of subunits of storage, the storage unit of the first storage type is configured to be copied in its entirety, as part of a backup operation, a unit of storage of the second storage type comprises a second plurality of subunits of storage, and the unit of storage of the second storage type is configured to be copied in its entirety, as part of the backup operation, and to permit copying of one or more of the second plurality of subunits of storage individually, as part of the backup operation. Further, the second storage unit is of another storage type, the another storage type is another of the first storage type or the second storage type, and the another storage type is one of the plurality of storage types other than the one storage type.

In certain embodiments, such a method can include retrieving the status from a file status cache (where the data includes a file). In some embodiments, the change in the status is a result of a data status event, and the data status event is at least one of a change in a frequency with which the data is accessed or a change in size of the data. In some embodiments, the data includes a file and the characteristic is an attribute of the file. In such embodiments, the change is a result of at least one of a file creation operation, a file write operation, or a file deletion operation.

In still other embodiments, the determining whether the move condition has been met includes determining whether the characteristic matches the move condition. In such embodiments, the determining whether the characteristic matches the move condition includes determining whether the characteristic meets or exceeds one or more criteria. Also in such embodiments, the determining whether the characteristic matches the move condition includes, for each criteria of a number of criteria, determining whether a corresponding characteristic of a number of corresponding characteristics meets or exceeds the each criteria (where the number of corresponding characteristics includes the characteristic). Also in such embodiments, such methods can further include, in response to each of the number of corresponding characteristics matching a corresponding one of the number of criteria, performing the moving.

In certain embodiments, the data includes a file, and the method further includes retrieving the status from a file status cache.

In still other such embodiments, such methods can further include updating the status in the file status cache upon the change (where the change is a result of one or more operations including at least one of a file creation operation, a file write operation, or a file deletion operation, and the updating is performed by a daemon configured to scan the file status cache for one or more results of the one or more operations).

In certain embodiments, such a method can include performing a snapshot operation (where the snapshot operation includes performing a volume copy operation on one or more storage units of the first storage type and performing a file copy operation on one or more storage units of the second storage type). In certain embodiments, the data is stored in a data volume, and the data volume, the local volume, and the map volume are stored in a partition.

In still other embodiments such methods can further include creating another partition, creating the first unit of storage in the another partition, and creating the second unit of storage in the another partition determining a size of a subunit of storage and comparing the size of the subunit of storage and a size threshold. In such embodiments, in response to a result of the comparing indicating metadata associated with the subunit of storage should be stored in a storage unit of the first storage type, selecting the unit of storage of the first storage type and performing the moving from a storage unit of the first storage type to a storage unit of the second storage type. In such embodiments, in response to the result of the comparing indicating the metadata associated with the subunit of storage should be stored in a storage unit of the second storage type, selecting the unit of storage of the second storage type and performing the moving from a storage unit of the second storage type to a storage unit of the first storage type.

In yet other such embodiments, the local volume is a loop volume, the status is stored in a file status cache, and the file status cache is stored in a header volume. In other embodiments, the first storage type is a map volume and the second storage type is a local volume.

Such methods can further include determining determining an access frequency of another subunit of storage (where the another subunit of storage is included in the data), comparing the access frequency and an access frequency threshold, and, in response to the comparing the access frequency and the access frequency threshold indicating that the moving should be performed, performing the moving.

The foregoing is a summary and thus contains, by necessity, simplifications, generalizations, and omissions of detail; consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

Embodiments of methods and systems such as those disclosed herein may be better understood, and its numerous objects, features, and advantages made apparent to those skilled in the art by referencing the accompanying drawings.

Figure 1:
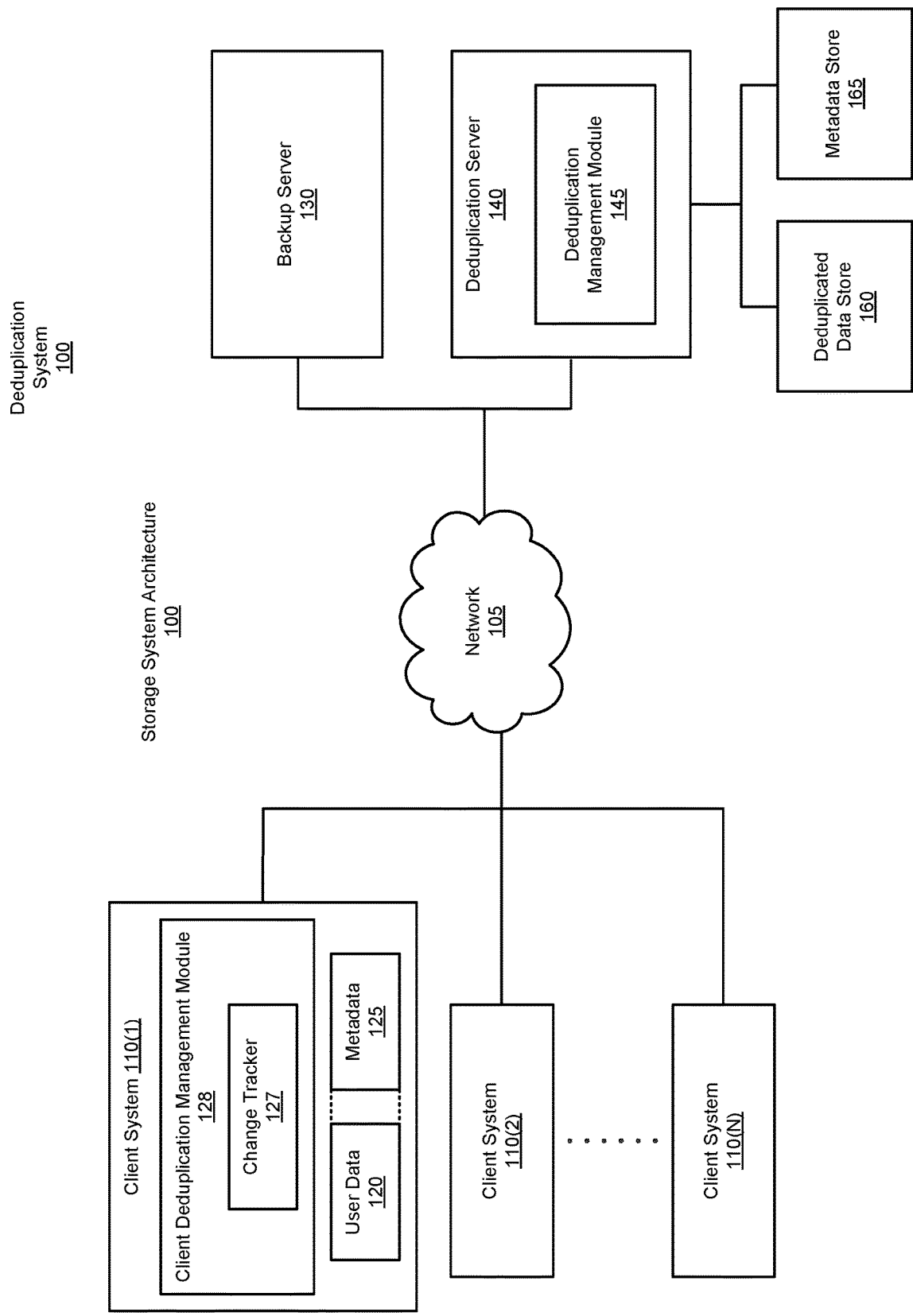
FIG. 1 is a simplified block diagram illustrating components of an example of a storage system architecture, according to embodiments of methods and systems such as those disclosed herein.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

The following is intended to provide a detailed description and examples of the methods and systems of the disclosure, and should not be taken to be limiting of any inventions described herein. Thus, because the methods and systems described herein are susceptible to various modifications and alternative forms, it will be appreciated that specific embodiments are provided as examples in the drawings and detailed description. It should be understood that the drawings and detailed description are not intended to limit such disclosure to the particular form disclosed. Instead, the intention is to cover all modifications, equivalents and alternatives falling within the spirit and scope of the appended claims.

Introduction

Methods and systems such as those described herein provide for network configuration and management in storage environments. Broadly, the concepts described herein are applicable to the efficient, effective storage of data, and more particularly, to methods and systems for the efficient storage and management of metadata.

A user-space file system can provide, for example, deduplicated data storage, as might be implemented by a storage appliance. In such a storage appliance, a universal share feature can be implemented that allows users/applications to dump one or more files to the shared storage area. For example, in storing a file, the file is composed of:
 a file header, which records file size info, file timestamps, and other metadata about the file (e.g., the location in which the extent map is stored);
 a file extent map, which records information regarding data segments that form the file's contents (such information can include data segment fingerprint and location information); and
 the actual data (e.g., data segment contents), which can be stored, for example, in (deduplicated) data containers.

As will be appreciated, the extent map for a given file will, typically, increase in size with increases in the given file's file size.

However, such storage systems can experience reduced performance in certain situations. For example, a user-space file system may not be able to efficiently create a snapshot for a large number of files (e.g., in the case of relatively small files that will tend to be relatively numerous), due to an already-large number of files resulting in an even-larger number of metadata files, and so, a correspondingly large number of input/output (I/O) operations needed to copy each such metadata file to create the snapshot. For example, in a scenario in which each file has two metadata files per file (e.g., a header (e.g., a header file or other such first portion of metadata) and an extent map (e.g., an extent map file or other such second portion of metadata)), the requisite number of I/O operations is double the number of files. Thus, copying the metadata for a large number of files individually (one-by-one) is, in relative terms, inefficient and resource intensive. This is undesirable in a number of situations, for example where a large number of files are dumped into a share and a snapshot taken of the share, resulting in such a snapshot operation taking a comparatively long time to complete, as a result of the large number of input/output (I/O) operations needed.

To address such issues, methods and systems such as those described herein provide for the storage of certain portions of a file (e.g., one or more portions of metadata (metadata portions)) in various storage constructs that facilitate efficient access to such portions. For example, in certain embodiments, such metadata portions, depending on one or more criteria, are stored in one or more separate storage constructs (e.g., metadata volumes) that support access methods appropriate to the metadata they store.

As an example, a file being stored can be made up of a header (e.g., a header file), an extent map (e.g., an extent map file), and one or more data segments, in the manner noted. Such a file's metadata can be stored as follows: the file's header file is stored in a header volume (e.g., a file-based loop volume (in the manner of a loop device, as is described in greater detail subsequently) and the file's extent map file in either a file-based loop volume or a local volume (e.g., as a file in a local file system), with the file's data segments being stored in one or more data volumes. In certain embodiments, a determination regarding whether to store the file's extent map file in a file-based loop volume or a local volume is made based, at least in part, on the file's access frequency and the file's size. In one embodiment, when a file is created in the user-space file system, the header file is stored in a file-based (header) loop volume, and the extent map file is stored in the local volume. Subsequently, in such embodiments, if the file is not accessed frequently and the size is smaller than a given threshold, the extent map file is moved from the local volume (a file-based volume) to an extent map volume (or more simply, a map volume; e.g., a filed-based loop volume). Conversely, if a file's file size grew to exceed the threshold, and the extent map were presently stored in a map volume, the extent map is moved back to local volume. Because a single copy operation can copy a filed-based loop volume (and so, the metadata stored therein), in its entirety, in a single operation, the copying of header files and (appropriate) map files is made more efficient. An increase in the number of comparatively small (small metadata), comparatively inactive files is addressed by allocating additional map volumes. Larger or more active files are stored on one or more local volumes, which can increase in size to accommodate larger files (larger extent maps), as well as through the allocation of additional local volumes.

Using such methods and systems, extent map files for relatively small (and so, numerous) files can be stored in one or more map volumes, while relatively larger or more active files' extent map files can be stored in a local volume. In certain embodiments, metadata files can be moved between the metadata volumes and local volumes (e.g., local file system) as the metadata changes (e.g., the size of the metadata files changes, as files become more or less active, and/or the like). Movement of metadata can be effected, for example, when the characteristics of a given file matches (and/or exceeds) one or more criteria (which may be preset, or may be determined dynamically). Such movement can, in certain embodiments, be effected in either direction (as between map volumes and local volumes). For example, a new extent map file can be stored in a local volume by default (which assumes that a new file will, at least initially, be active), and subsequently, move to a map volume, if necessary (e.g., given the proper conditions, such as remaining comparatively small and inactive).

Alternatively, a new extent map file can initially be stored in a map volume (e.g., which assumes a file initially stores little data and, being new, would not have an access history), and then move to the local volume if the file's file size reaches (is substantially equal to, exceeds, or otherwise meets) the given threshold(s) (e.g., a file size threshold) and/or its file becomes sufficiently active. Metadata movement can thus be determined, for example, by the corresponding data's activity (active status) and file size. In some embodiments, both conditions are configurable. In such embodiments, once the file matches the move condition, then the file is moved from its map volume to a local volume (or, in the alternative, from its local volume to a map volume). For example, when a given file (or its metadata) matches the movement condition, the extent map can be moved from its map volume to the local volume on the same partition. Conversely, if a file's file size becomes smaller and the file's status is non-active (and so, matches the movement condition), the file's extent map is moved from the local volume in question to the appropriate map volume. Each file's header (e.g., header file or other such metadata) can include a flag (or other construct) to mark the location of the extent map file.

In one embodiment, a share has one header volume, and N map volumes, one per partition, and also a local volume on each such partition (or local file system). The map volumes and local volumes store the files' extent maps (extent map files, for example), as noted. In the case of a universal share, the local file system can be any of a variety of filesystems. Facilities in a user-space file system, for example, can be used to create the map volumes when creating the share, and to delete those metadata volumes when deleting the share. The user-space file system also monitors the data usage of the metadata volumes and automatically extends the volume size when the disk usage of the volume reaches the applicable threshold. One default that can be used for such a space usage threshold is 80% (or some other appropriate percentage) of a given volume's present size.

Examples of metadata operations include the following:
File create: the header file is stored in the header volume, a simple hash is used to calculate the file name and select a map volume, the extent map file is stored in the selected volume, and the extent map volume location is updated in the header file.
File delete: the extent map volume's location in the header file is determined, providing the real extent map file path: map volume+file path. Delete the path from the file group, and remove the extent map file and header file.
File update/write: The file write operation checks the metadata movement conditions. The write operation can trigger the metadata movement, if the file size matches the file size condition.
Metadata movement: A file status cache tracks the file status—events such as when a file is created, deleted, or updated, or any other attribute changes occur. Such changes are reflected in the file status cache. Once a share is mounted, the system scans the header files to determine if there are any files that match the move condition. Files matching the move conditions are stored in the cache. A background task (e.g., daemon) checks the cache within an interval time. The interval time is configurable and can change with the extent map files. The file is not operational when it's being moved.
To move a file from a map volume to a local file system (e.g., if the file size is bigger than the file size threshold), the file is locked, the extent map is copied from the map volume to the local file system on the same partition, and the extent map location flag then updated to unlock the file. For example, to move a file from the local file system to the map volume (e.g., if the file size is less than the file size threshold and the file is not active). The file monitor locks the file path, and moves the extent map from the local file system to map volume on the same partition.

When implemented in a user-space file system, management of metadata stored therein is also simplified. Using commands such as the following, map volumes can be created, managed, and deleted as a unitary construct, rather than having to perform such actions on metadata individually (e.g., on a file-by-file basis):
Create metadata volumes with a user-space file system share/snapshot creation operation
Mount metadata volumes with a user-space file system share mount operation
Unmount metadata volumes with a user-space file system share unmount operation
Delete metadata volumes with a user-space file system share/snapshot deletion operation Volume management, in certain embodiments, can be accomplished as follows. For example, in performing a user-space file system snapshot operation, the metadata volumes in question (e.g., header volume and the map volume) can be copied as volumes, in their entirety. Files stored in a local volume are copied individually, on a file-by-file basis.

Using embodiments such as those described herein, there is no additional action for the files which are not in memory. The actively-used files need only be synchronized or flushed to ensure the file's header and extent map files are saved to the appropriate volumes. The header volume and map volume(s) are then copied, as are each of the extent maps on the local file system. Further, given that the files' data need not be copied in certain operations (e.g., snapshot operations), embodiments such as those described herein can provide a meaningful improvement in storage system performance without affecting the storage of the file's data segments.

Thus, methods and systems such as those described herein address the foregoing issues and others by providing techniques that employ the aggregation of portions of subunits of storage (e.g., various portions of the metadata of files) into units of storage (e.g., volumes) that support the copying of those units of storage in their entirety, where the characteristics of such units storage make such units in storage amenable to such storage and copying. In providing such functionality, methods and systems such as those described herein are thus provide flexible, efficient, and effective techniques for the storage and management of metadata stored in, for example, a user-space file system. And while the methods and systems described herein are discussed, at points, in terms of their use in an architecture that implements a user-space file system, and in terms of partitions, volumes, and files, it will be appreciated that such methods and systems can be applied in other storage architectures and provide advantages such as those described herein.

Example Storage System Architecture

FIG. 1 is a simplified block diagram illustrating components of an example of a deduplication system (depicted, for example, as a deduplication system 100), in which the present disclosure can be implemented. Deduplication system 100 includes a network 105 that communicatively couples one or more client systems 110(1)-(N), a backup server 130, and deduplication server 140 (includes a deduplication management module 145). Each component is discussed in further detail below.

One or more client systems 110(1)-(N), also referred to herein as client devices 110 and/or client systems 110, can be implemented using, for example, a desktop computer, a laptop computer, a workstation, a server, or the like. An example of such computing devices is described subsequently. One or more client systems 110(1)-(N) can be configured to communicate with backup server 130 and deduplication server 140 via network 105. An example of network 105, which can be used by client systems 110 to access backup server 130 and deduplication server 140, is a local area network (LAN) utilizing Ethernet, IEEE 802.11x, or some other communications protocol. While FIG. 1 illustrates client system 110(1) including user data 120 and metadata 125 (and such being associated with one another, by dotted lines), each client system can store different user data 120 and metadata 125 in storage local to the client system.

Also shown as being implemented in client system 110(1) is a change tracker (illustrated in FIG. 1 as a change tracker 127). Change tracker 127 can be implemented, for example, as part of a client deduplication management module (illustrated in FIG. 1 as a client deduplication management module 128). Moreover, change tracker 127 can be implemented, for example, as a change block tracker, detecting data (e.g., data blocks) written by, for example, an application executed by client system 110(1). Such a change block tracker can track units of storage (e.g., disk sectors, data blocks, or the like) that have been changed, for example, by the aforementioned application. Such a list of changed units of storage is referred to herein as a data object change tracking list, or more specifically, a file change tracking list (and more generically as a change tracking stream). Once identified, such changed units of storage can be transferred from the computing system in question to a backup server (e.g., backup server 130) or a deduplication server (e.g., such as deduplication server 140), for example. In certain embodiments, such changed units of storage can be sent to a proxy server, for further conveyance to the proper destination, then or at a later time. As will be appreciated in light of the present disclosure, such an implementation is presented merely as an example, and such change tracking can be performed by any computing device shown in FIG. 1 (e.g., by deduplication server 140) and/or another computing device not shown in FIG. 1.

User data 120 can include various data that is generated and/or consumed by a user of client system 110(1). User data 120 can include executable files, such as those used to implement applications and operating systems, as well as files that are used or generated by such executable files. User data 120 can include files generated by user applications (e.g., word processing programs, email programs, graphics programs, a database application, or the like) executing on client system 110(1). Some of the user data 120 may also be transferred to backup server 130 and/or deduplication server 140 via a network 105 to be included in deduplicated data store 160, and the associated metadata (e.g., metadata 125). Each of client systems 110 can send different user data and metadata to backup server 130 and/or deduplication server 140.

Metadata 125 can include data about the user data 120. Metadata 125 can be generated by client system 110(1), such as during a backup process. Whenever a user (e.g., an application or human user) requests that client system 110 add all or part of user data 120 to the deduplicated data store 160 (e.g., as part of a regularly scheduled full or partial backup of the client system), client system 110(1) can read user data 120 and metadata 125 (or generate metadata 125 about user data 120), such as one or more identifiers (also referred to herein as signatures), that can identify different portions of user data 120. Client system 110 can provide metadata 125 as a list (e.g., a list of signatures) to deduplication server 140. Metadata 125 can be used by deduplication server 140 to determine whether a portion of user data 120 is not already stored in deduplicated data store 160 (and so should be added to the deduplicated data store 160, as further discussed below).

As noted, backup server 130 is also coupled to network 105. Backup server 130 can include one or more physical servers configured to perform a variety of tasks related to management and implementation of backup services for deduplication system 100, such as performing a full or partial backup of a client system. In deduplication system 100, backup server 130 is further configured to communicate with deduplication server 140 for purposes of storing backups of data from client systems 110(1)-(N) in resources controlled by deduplication server 140. Such communication can be via network 105 or via a direct link between the backup server 130 and deduplication server 140. Information that can be provided by backup server 130 to deduplication server 140 can include a unique identification associated with each data stream provided by one of client systems 110(1)-(N) to the deduplication server 140. The backup server 130 can also provide sequence number identification for to identify sequential data transmitted in each uniquely identified data stream. Deduplication server 140 (and more particularly, deduplication management module 145) can then use such information to associate received data streams from client systems 110(1)-(N) in accord with embodiments of the present invention, as further discussed subsequently.

Backup services can be implemented in deduplication system 100 as a client-server application (not shown), with a server component (e.g., residing in backup server 130) and a client component (e.g., residing on client systems 110) of the client-server application. A server component can be configured to communicate with a client component during a backup process. Certain functions of the backup services can be performed by the client and server components, where the functions may be divided between the two components, or may be performed completely by one component or the other, depending on the implementation of the backup application. For example, backup server 130 can be configured to perform tasks that include communicating with client systems 110 to initiate backup tasks on the clients, maintaining databases related to files and other information backed up from file systems associated with the clients, and managing or tracking resources storing backups of client systems 110.

Deduplication server 140 is also coupled to network 105 and performs a variety of tasks related to management and implementation of deduplication services for the system illustrated in FIG. 1. Deduplication server 140 can include one or more physical servers configured to perform a variety of tasks related to deduplication services, which can be managed by deduplication management module 145. For example, deduplication server 140 can provide deduplication services for eliminating duplicated data content in a backup context. Deduplication services help reduce an amount of storage needed to store backups of enterprise data (e.g., user data 120) by providing a mechanism for storing a piece of information only one time. Such storage can be managed by deduplication management module 145. Thus, in a backup context, if a piece of information is stored in multiple locations within an enterprise (e.g., on multiple client systems 110), that piece of information will only be stored one time in a deduplicated backup storage area, such as deduplicated data store 160. Also, if the piece of information does not change between a first backup and a second backup, then that piece of information will not be stored during the second backup as long as that piece of information continues to be stored in the deduplicated backup storage area. Data deduplication can also be employed outside of the backup context, thereby reducing the amount of active storage occupied by duplicated files.

Deduplication services can be implemented in the deduplication system 100 as a client-server application (not shown), with a server component (e.g., residing on deduplication server 140) and a client component (e.g., residing on client systems 110) of the client-server application. For example, during a backup process for storing a backup of user data 120 in deduplicated data store 160, a client component of the deduplication services can be configured to generate metadata 125 about user data 120, such as one or more identifiers, or signatures, that can identify different portions of user data 120, and to communicate metadata 125 to a server component, which is discussed further below. Certain functions of the deduplication services can be performed by the client and server components, where the functions may be divided between the two components, or may be performed completely by one component or the other, depending on the implementation of the backup application.

Deduplication server 140 is in turn coupled to network storage for deduplicated data that includes a deduplicated data store 160 and a metadata store 165. Deduplicated data store 160 is a storage area in which deduplicated data can be stored. Deduplicated data store 160 can be configured as single instance storage. In single instance storage, only a single instance of a piece of data is stored. A common use of single instance storage is for maintaining data backups for servers and other computing clients in a network. For each backup, only a single instance of information duplicated in deduplication system 100 will be stored in the single instance storage area. In addition, for subsequent backups occurring over time, data items that have not changed from one backup to another need not be stored in the subsequent backup. In this manner, significant savings in data storage space can be realized by eliminating duplicated data content.

Metadata store 165 is a storage area that contains various metadata regarding the deduplicated data stored in deduplicated data store 160, such as information regarding backup images stored in deduplicated data store 160 (also referred to herein as a catalog), including, in certain embodiments, references to the files included in a given backup. It is these references (e.g., file references) to which methods and systems such as those described herein are directed, with regard to improving the efficiency with which such references are managed. That being the case, metadata store 165 is configured with data constructs and structures, such as those described subsequently herein, in order to facilitate performance of processes such as those also described subsequently herein.

The various metadata (including metadata 125) can be stored in, among other locations, a central index. For example, deduplication server 140 can use metadata 125, such as the list of signatures from client systems 110, to determine if portions of a backup image (e.g., portions of user data 120) are non-duplicative of portions already stored in deduplicated data store 160. Once deduplication server 140 determines that a portion of user data 120 is not duplicative of the data already stored in deduplicated data store 160 and thus should be added to the deduplicated data store 160, deduplication server 140 can store a corresponding identifier, or signature, of the portion of user data 120 in the central index. Deduplication server can request the non-duplicative portions (or unique portions) from client systems 110 by identifying the unique portion with the portion's associated signature.

As the unique portions are received via a data stream from client systems 110, the unique portions can be written into a fixed-size container (e.g., also referred to herein as a container file, and includes these and/or other storage construct) stored at deduplication server 140, such as in a cache or other storage unit. Once the container is full of unique data segments, in certain embodiments, the entire container can be written to a location in deduplicated data store 160. The container written to the deduplicated data store 160 can also include a local container index, which indicates a local location of each unique portion stored within the container. The local container index can contain a signature associated with each unique segment stored in the container, or alternatively can contain a shortened version of the signature of each unique segment stored in the container. Deduplication server 140 can maintain information identifying a container (e.g., a container identifier (a "container ID") of the container) in a central index as a location for each unique portion in the container. The signature of a unique portion can also be associated with the location of the unique portion in an entry of the central index, where the central index includes an entry for each portion stored in the deduplicated data store 160. Thus, an identification of a portion's location, or a container ID, can be found in the central index by using the signature of the portion as a key in the central index. The location of the portion within the container identified by the container ID can be found in the local container index of the container by using at least a part of the signature as a key in the local container index.

Multiple backup images can be stored in the deduplicated data store 160. For example, a first backup image can be captured from user data 120 and can be stored in deduplicated data store 160. A subsequent backup image captured from user data 120 can contain duplicate portions that are identical to portions of the first backup image already stored in deduplicated data store 160 and can contain unique portions that are not identical to portions of the first backup image (e.g., portions that correspond to changed user data 120). The unique portions of the subsequent backup image can be written to deduplicated data store 160, while the duplicate portions will not be written (since the duplicate portions are identical to instances of portions already stored in deduplicated data store 160). Since only single instances of portions of a backup image are stored in deduplicated data store 160, metadata store 165 can provide a mapping of a backup image to the various non-duplicative portions stored in deduplicated data store 160 that compose the backup image. Thus, a single backup image can be associated with multiple portions stored throughout the deduplicated data store 160, and multiple backup images can be associated with a single portion (e.g., the multiple backup images share the single portion). For example, the subsequent backup image can be associated with unique portions of the subsequent backup image that were written to deduplicated data store 160 and with unique portions of the first backup image that were previously written to the deduplicated data store 160. Metadata store 165 can store associations between a backup image and the portions that compose the backup image as a group of references or pointers, where each reference indicates an entry of the central index that corresponds to a portion included in the backup image.

As additional backup images are added to deduplicated data store 160, backup image data can become fragmented across deduplicated data store 160 as portions of changed user data 120 are stored. Thus, a recent backup image stored in deduplicated data store 160 may include portions of recently changed user data 120 contiguously located in deduplicated data store 160, and may include multiple references to previously changed user data associated with older backup images, which are stored in various non-contiguous locations throughout deduplicated data store 160. If a user were to restore the recent backup image from deduplicated data store 160, deduplication server 140 would have to read numerous portions of data associated with older backup images from across the various locations (e.g., various containers) in deduplicated data store 160. Thus, as a backup image becomes more fragmented, restoration of the backup image can become more inefficient due to the increasing amount of time spent on performing a growing number of access operations needed to read each portion of data of the backup image from various locations in deduplicated data store 160 (e.g., determining a location for each of the multiple portions from metadata store 165).

Deduplicated data store 160 and metadata store 165 can be stored in network storage. Network storage can be implemented as network attached storage (NAS), file servers, storage filers, and/or network shares. Network storage can be implemented as a single storage device or as a collection of storage devices. Network storage can also be implemented as a storage area network (SAN), which couples remote storage devices to a server (e.g., a storage server), such that the remote storage devices appear as locally-attached storage devices to the server's operating system (OS), for example. Network storage can include a data volume.

In light of the present disclosure, it will be appreciated that network storage can be implemented by any type of computer-readable storage medium, including, but not limited to, internal or external hard disk drives (HDD), optical drives (e.g., CD-R, CD-RW, DVD-R, DVD-RW, and the like), SSD and/or FLASH memory drives (e.g., USB memory sticks and the like), tape drives, removable storage in a robot or standalone drive, and the like. Alternatively, it will also be appreciated that, in light of the present disclosure, deduplication system 100 and network 105 can include other components such as routers, firewalls and the like that are not germane to the discussion of the present disclosure and will not be discussed further herein. It will also be appreciated that other configurations are possible. For example, client systems 110 can be directly coupled to deduplicated data store 160 and/or metadata store 170, and so on.

The letter N is used to indicate a variable number of devices or components. For example, a variable number of clients are implemented in the deduplication system. Although the letter N is used in describing a variable number of instances of each of these different devices and components, a repeated use of the letter N does not necessarily indicate that each device and component has a same number of N instances implemented in the deduplication system.

Figure 2:
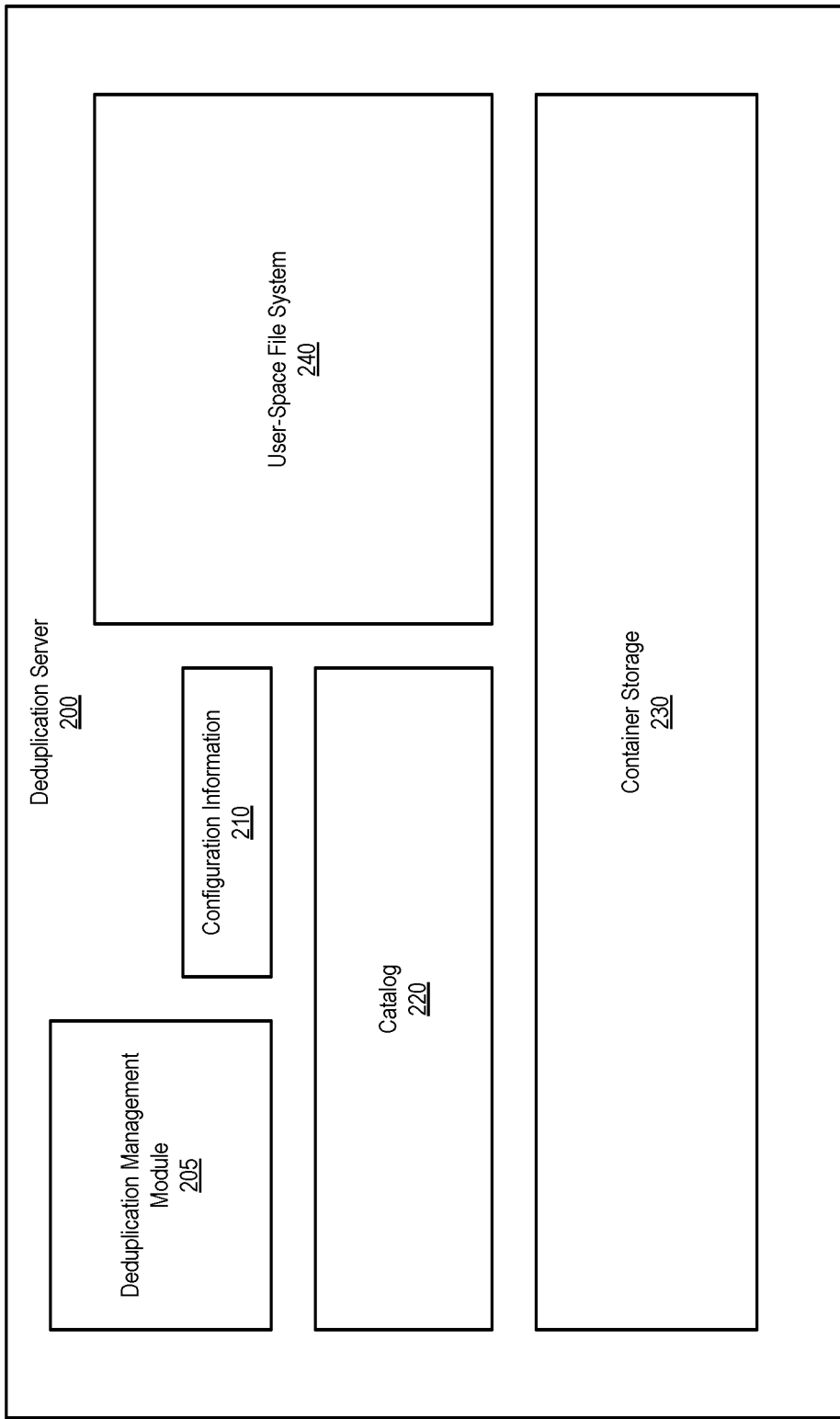
FIG. 2 is a simplified block diagram illustrating an example of a storage system, according to embodiments of methods and systems such as those disclosed herein.

FIG. 2 is a simplified block diagram illustrating an example of a deduplication system that provides a user-accessible storage area, according to methods and systems such as those described herein. That being the case, FIG. 2 depicts one embodiment of a deduplication server 200, in the manner of deduplication server 140 of FIG. 1. Deduplication server 200 includes a deduplication management module 205 (e.g., in the manner of deduplication management module 145, described earlier in connection with FIG. 1), which manages and maintains a variety of information, including, in the depicted embodiment, configuration information 210, catalog information 220 and container storage 230. In the embodiment depicted in FIG. 2, deduplication server 200 also supports a user-space file system 240. Despite existing in the storage of deduplication server 200, user-space file system 240 can be accessed from other computing systems (e.g., client systems 110), by users of such other computing systems, in the manner of file systems local to those computing systems. Such can be accomplished using, for example, protocols such as NETWORK FILE SYSTEM (NFS), SERVER MESSAGE BLOCK (SMB), COMMON INTERNET FILE SYSTEM (CIFS), or the like. For example, a directory in user-space file system 240 can be mounted in a file system of one or more of client systems 110, and so allow users of those client systems to write information to and access information in user-space file system 240, which allows files written into such a user-space file system to be deduplicated. However, as noted elsewhere herein, such access is not without problems. For example, such shared access may be employed in ways that present the challenges. Such challenges can include constantly-changing numbers of files, file sizes, access patterns, and the like. That being the case, the structure of deduplication server 200 is presented as an example of a system in which methods and systems such as those described herein can be employed to good effect. In taking advantage of such methods and systems, such systems can enjoy improve performance while still providing the requisite flexibility and functionality.

Figure 3:
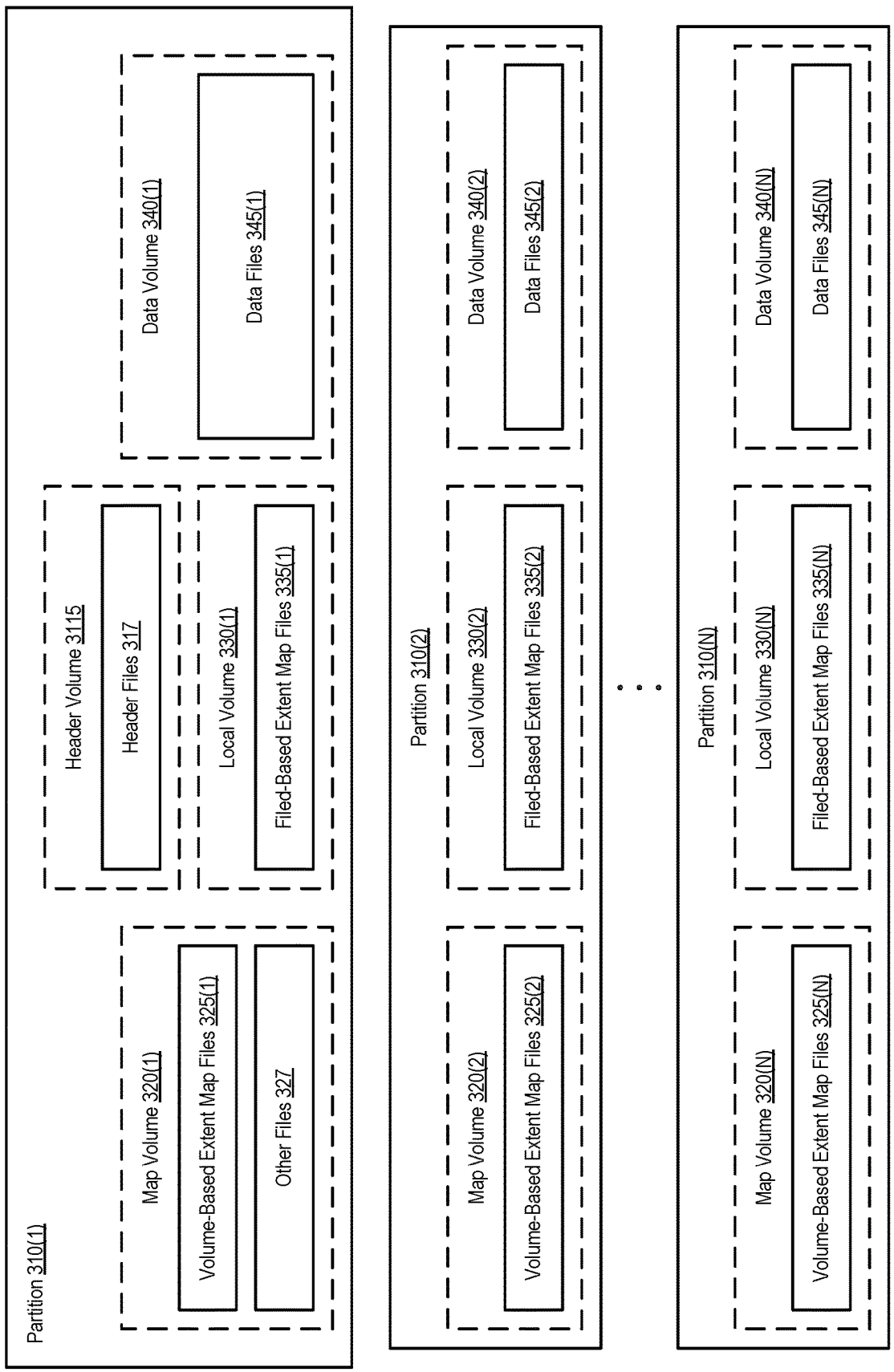
FIG. 3 is a simplified block diagram illustrating components of an example of a storage construct architecture, according to embodiments of methods and systems such as those disclosed herein.

FIG. 3 is a simplified block diagram illustrating components of an example of a storage construct architecture, according to embodiments of methods and systems such as those disclosed herein. FIG. 3 thus depicts a storage construct architecture 300. Storage construct architecture 300 can be stored, for example, in a user-space file system such as user-space file system 240. By allowing a user to direct an application to store data in such a user-space file system (e.g., as can be accomplished by mounting user-space file system on a mount point (e.g., a directory) in an existing file system), such data can not only be stored for, and so, made available to the application, but the deduplication of such data can also be performed.

Storage construct architecture 300 (e.g., in the context of a user-space file system) can include one or more partitions. Examples of such partitions are depicted in FIG. 3 as partitions 310(1)-(N), and referred to in the aggregate as partitions 310. Unlike others of partitions 310, partition 310(1) is depicted as including a header volume 315. Header volume 315, in turn, includes one or more header files (depicted in FIG. 3 as header files 317). In the example described in connection with FIG. 3, each file stored in the user-space file system has associated therewith a header file that stores information regarding the file, such as file status, access control information, and the like. Further, it will be appreciated that, while the terminology used in discussing the storage constructs described herein are in terms of files, volumes, and partitions, such storage constructs are merely examples, and other units and subunits of storage can employ methods and systems such as those described herein to equally good effect, so long as such other units and subunits of storage variously provide comparable mechanisms for access (e.g., such that certain such storage constructs are accessible as a whole and/or by subdivisions thereof).

Header volume 315 can be implemented, for example, as a file-based loop volume (a volume within the partition in question that is of a volume type of file-based loop volume). In certain operating systems (e.g., UNIX-like operating systems), a loop device (in this case, a loop volume (which can also be implemented using a virtual node (vnode) storage unit or loop file interface)) is a pseudo-device that makes a file accessible as a block device (or, more broadly, allows a device to be accessed at two or more levels of granularity, such as a volume accessible as a volume, in its entirety, or each file of the collection of files stored therein). Before use, a loop device is associated with (e.g., connected to) an existing file in the file system. The association provides the user with an application programming interface (API) that allows the file to be used in place of a block special file (as compared to a device file system). Thus, for example, a file containing a file system may then be mounted as if that file were a disk device. In the present example, while header files 317 can be stored in header volume 315 as individual files, header volume 315 can be manipulated as a single object, and so, in the aggregate, header files 317 (e.g., header volume 315 can be copied in a single copy operation (e.g., an operation that copies the given volume as a unitary structure, in its entirety), rather than having to perform a copy operation for each of header files 317 individually). Further, while only partition 310(1) is depicted as including a header volume, this does not preclude other partitions from including one or more such header volumes.

Partition 310(1) also includes a map volume 320(1), a local volume 330(1), and a data volume 340(1). Further, as is also depicted in FIG. 3, these remaining volumes are depicted as existing in each of partitions 310. That being the case, map volume 320(1) is one of a number of map volumes (depicted in FIG. 3 as map volumes 320(1)-(N), and referred to in the aggregate as map volumes 320). In turn, each of map volumes 320 is shown as including one or more volume-based extent map files (depicted in FIG. 3 as volume-based extent map files 325(1)-(N), and referred to in the aggregate as volume-based extent map files 325). In addition, map volume 320(1), among others, may also include one or more other files (depicted in FIG. 3 as other files 327). As will be appreciated from earlier discussions herein, map volumes such as map volumes 320 are file-based loop volumes, and so provide the advantages described in connection with such storage constructs. As discussed earlier, one example of an advantageous use of such storage constructs is for comparatively small files (and so, comparatively small amounts of metadata) that are infrequently accessed (in relative terms, a low access frequency). In such scenarios, rather than suffer the relatively high resource consumption involved in copying numerous small amounts of metadata, a file-based loop volume such as those implemented as map volumes 320 allow for a single copy operation, and with it, meaningfully-reduced resource consumption (e.g., a significantly lower number of input/output (I/O) operations).

In a similar fashion, local volume 330(1) is one of a number of local volumes included in corresponding ones of partitions 310 (depicted in FIG. 3 as local volumes 330(1)-(N), and referred to in the aggregate as local volumes 330). In turn, each of local volumes 330 is shown as including one or more file-based extent map files (depicted in FIG. 3 as file-based extent map files 335(1)-(N), and referred to in the aggregate as file-based extent map files 335). However, in contrast to map volumes 320, local volumes 330 are implemented as file-based volumes. In implementing local volumes 330 as file-based volumes, metadata stored therein is managed at the file level. In certain embodiments, this translates to such file-based volumes only being configured to permit access to metadata individually (rather than in the aggregate, as permitted by file-based loop volumes). For files that are accessed, in relative terms, frequently (in relative terms, a high access frequency), and/or comparatively large files, consistent access at the file level is desirable in order to provide, for example, the ability to concurrently copy such files, in order to provide better performance, given the constantly changing nature of such files and/or the ability to copy large amounts of metadata in one or relatively few copy operations.

Further still, data of the various files is stored in various ones of a number of data volumes included in corresponding ones of partitions 310 (depicted in FIG. 3 as data volumes 340(1)-(N), and referred to in the aggregate as data volumes 340). Stored within each of data volumes 340 are one or more units of data (e.g., data segments) of the files in question (depicted in FIG. 3 as data files 345(1)-(N), and referred to in the aggregate as data files 345). As noted, the storage of such units of data in a user-space file system that supports data deduplication facilitates not only the deduplication of such units of data, but also allows for snapshots to be taken of such data, for example. In so doing, while such snapshot operations include the copying of header files and extent files (either by volume-based copying or file-based copying), references to the data in question included in such header files and extent files will continue to reference the appropriate data, and so, avoid the need for the data itself to be copied.

Figure 4:
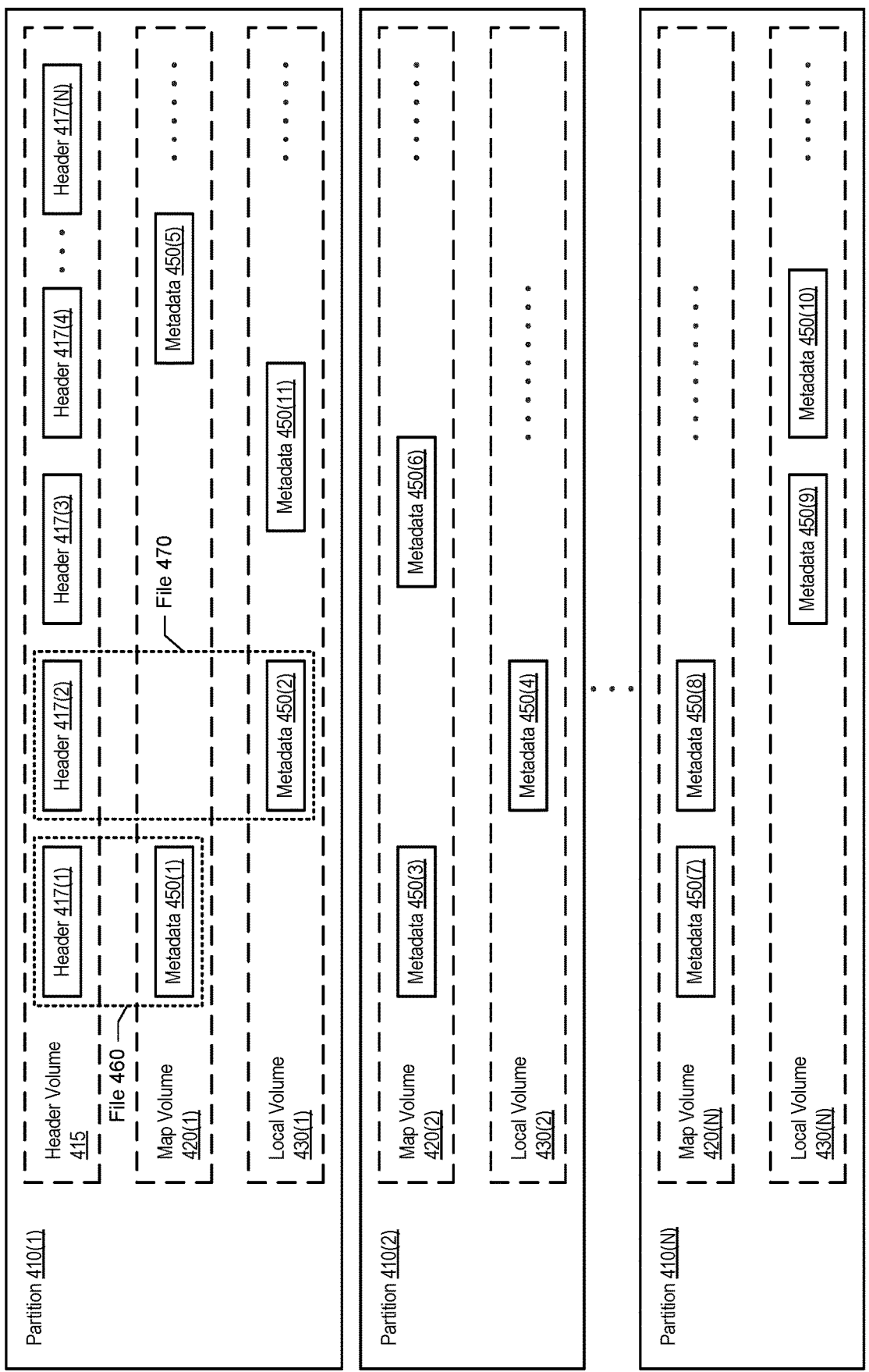
FIG. 4 is a simplified block diagram illustrating components of an example of a storage construct architecture, according to embodiments of methods and systems such as those disclosed herein.

FIG. 4 is a simplified block diagram illustrating components of an example of a storage construct architecture, according to embodiments of methods and systems such as those disclosed herein. FIG. 4 thus depicts a storage construct architecture 400. Storage construct architecture 400 can be stored, for example, in a user-space file system such as user-space file system 240. As noted, by allowing a user to direct an application to store data in such a user-space file system, such data cannot only be stored for, and so, made available to the application, but the deduplication of such data can also be performed.

Storage construct architecture 400, in the manner of storage construct architecture 300, includes a number of partitions. Examples of such partitions are depicted in FIG. 4 as partitions 410(1)-(N), and referred to in the aggregate as partitions 410. Unlike others of partitions 410, partition 410(1) is depicted as including a header volume 415. As before, header volume 415, in turn, includes one or more header files (depicted in FIG. 3 as headers 417(1)-(N)). Also as before, each file stored in the user-space file system has associated therewith a header file (or more simply, a header) that stores information regarding the file, such as file status, access control information, and the like.

Partitions 410 each include a map volume (depicted in FIG. 4 as map volumes 420(1)-(N), and referred to in the aggregate as map volumes 420) and a local volume (depicted in FIG. 4 as local volumes 430(1)-(N), and referred to in the aggregate as local volumes 430). Unlike storage construct architecture 300, however, storage construct architecture 400, as depicted in FIG. 4, does not depict the various data volumes or the units of data stored therein for the sake of simplicity. Further in this regard, embodiment such as those described herein are able to maintain such data volumes and their constituent units of data in their original storage locations, given the use of references in the headers and metadata.

Each of map volumes 420 and local volumes 430 are depicted in FIG. 4 as storing metadata for one or more files (e.g., stored in the user-space file system; depicted in FIG. 4 as metadata 450(1)-(11), and referred to in the aggregate as metadata 450; although it is to be appreciated that, given the correspondence between headers 417 and metadata 450, additional metadata files are contemplated as being stored in one of map volumes 420 and local volumes 430). To that end, examples of the correspondence between ones of headers 417 and metadata 450 are presented by files for 60 and 470. As noted, map volumes 420 are intended to store metadata for smaller and less active files, which metadata will tend to also be smaller and less likely to change. Alternatively, as also noted, local volumes 430 are intended to store metadata for larger and/or more active files, which metadata will tend to also be larger and/or more likely to change. In this regard, the correspondence between header 417(1) and metadata 450(1) is depicted for file 460, which, based on the earlier discussion, indicates file 460 is a comparatively small file that has not been accessed frequently (based on the storage of metadata 450(1) being stored in map volume 420(1)). By contrast, file 470, as indicated by the correspondence between header 417(2) and metadata 450(2), is a comparatively large and/or frequently accessed file, by virtue of metadata 450(2) being stored in local volume 430(1).

It will be further appreciated that, in addition to the correspondences between headers in header volume 415 and metadata in map volume 420(1) and local volume 430(1), various other correspondences between ones of headers 417 and metadata 450 can be seen. Further, such correspondences are not limited to the volumes of partition 410(1), but can be seen throughout partitions 410. For example, the metadata corresponding to header 417(3) is stored as metadata 450(3) in map volume 420(2) of partition 410(2), while the metadata corresponding to header 417(4) is stored as metadata 450(4) in local volume 430(2) of partition 410(2). Further such correspondences exist as between others of headers 417 and metadata 450.

In certain situations, as where a file is newly created, the newly-created file will be comparatively small and, being new, will have no history as to the frequency with which it is accessed. In such a case, the newly-created file's header will be stored in header volume 415 as one of headers 417, and its metadata stored in one of local volumes 430. Such an example is presented in connection with metadata 450(11), which represents the metadata of a comparatively small, newly-created file.

Figure 5:
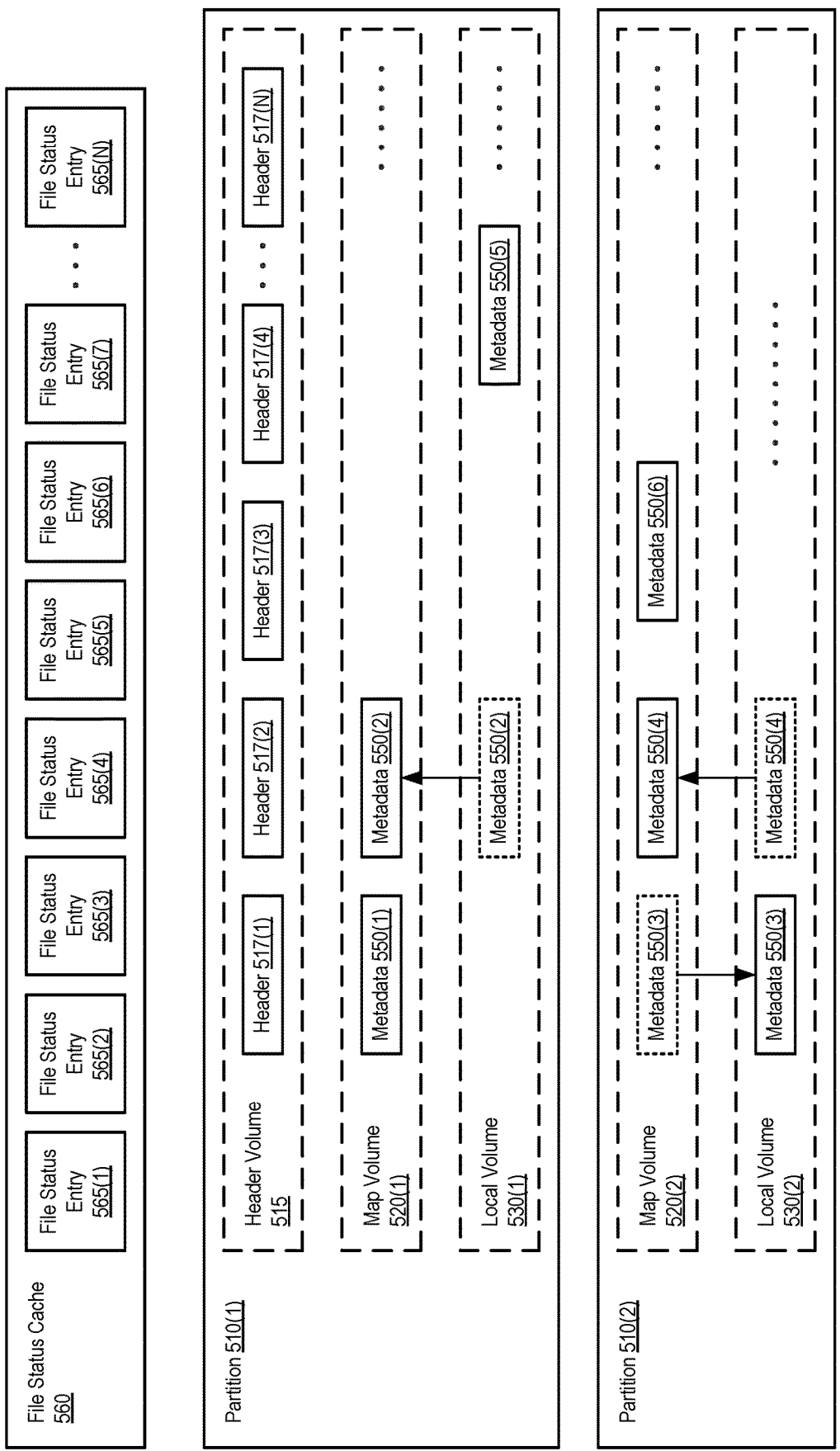
FIG. 5 is a simplified block diagram illustrating components of storage constructs in an example of a storage system architecture, according to embodiments of methods and systems such as those disclosed herein.

FIG. 5 is a simplified block diagram illustrating components of storage constructs in an example of a storage system architecture, according to embodiments of methods and systems such as those disclosed herein. FIG. 5 thus depicts a storage system architecture 500. Storage system architecture 500 can be stored, for example, in a user-space file system such as user-space file system 240. As noted, by allowing a user to direct an application to store data in such a user-space file system, such data cannot only be stored for, and so, made available to the application, but the deduplication of such data can also be accomplished.

Storage system architecture 500, in the manner of storage construct architecture 300, includes a number of partitions. Examples of such partitions are depicted in FIG. 5 as partitions 510(1)-(2) (and referred to in the aggregate as partitions 510; although, in the manner described in connection with FIGS. 3 and 4, additional such partitions are contemplated hereby). In the manner previously described, partition 510(1) is depicted as including a header volume 515. As before, header volume 515, in turn, includes one or more header files (depicted in FIG. 3 as headers 517(1)-(N)). Also as before, each file stored in the user-space file system has associated therewith a header file (or more simply, a header, although a storage construct of a file need not necessarily be used) that stores information regarding the file, such as file status, access control information, and the like.

As described in connection with FIG. 5, partitions 510 each include a map volume (depicted in FIG. 5 as map volumes 520(1)-(2), and referred to in the aggregate as map volumes 520) and a local volume (depicted in FIG. 5 as local volumes 530(1)-(2), and referred to in the aggregate as local volumes 530). In the manner of storage construct architecture 400, storage system architecture 500 does not depict the various data volumes or the units of data stored therein for the sake of simplicity. As noted, embodiment such as those described herein are able to maintain such data volumes and their constituent units of data in their original storage locations, given the use of references in the headers and metadata.

Each of map volumes 520 and local volumes 530 are depicted in FIG. 5 as storing metadata for one or more files (e.g., stored in the user-space file system; depicted in FIG. 5 as metadata 550(1)-(6), and referred to in the aggregate as metadata 550; although it is to be appreciated that, given the correspondence between headers 517 and metadata 550, additional metadata files are contemplated as being stored in one of map volumes 520 and local volumes 530). As discussed previously, header volume 515 and map volumes 520 are, in certain embodiments, implemented as file-based loop volumes (and so, allowing the metadata files stored therein to be managed as either individual files or as a volume), while local volumes 530 are implemented as file-based volumes (and so, allowing the metadata files stored therein to be managed as individual files).

Also depicted as being included in storage system architecture 500 is a file status cache (FSC) 560. File status cache 560 includes a number of file status entries (depicted in FIG. 5 as file status entries 565(1), and referred to in the aggregate as file status entries 565). Each of file status entries 565, as well as of headers 517, correspond to a file stored in, for example, the user-space file system in question. In the manner discussed previously, the metadata for each of these files (e.g. metadata 550) is stored in one of map volumes 520 or local volumes 530 (e.g., in the manner depicted in FIG. 5).

However, as time goes by, the file size of each of those files may change, and with them, the amount of metadata for each such file. Further, the frequency with which anyone of those files is access may change. In view of such potential eventualities, methods and systems such as those described herein can implement processes and provide mechanisms that permit such methods and systems to adapt to such changing conditions. To that end, various processes can be implemented to facilitate the transfer of metadata between ones of map volumes 520 and local volumes 530. For example, a process such as that described in connection with FIGS. 12 and 13 can be implemented to effect such transfers. In so doing, a daemon or other process can be employed to examine information regarding each file (e.g., as by examining each file's file status entry in file status cache 560).

As is depicted in FIG. 5, a file that is comparatively small me have its metadata (e.g., metadata 550(2)) stored in a local volume (e.g., local volume 530(1)) as a result of its being accessed at a comparatively high frequency. However, at a later time, such a file may become less active (or inactive), making its storage in a local volume inappropriate. By analyzing the file (e.g., as by reading information from its file status entry (file status entry 565(2)), the storage management system in question can make a determination as to whether the analysis indicates that the file's metadata (metadata 550(2)) should be transferred from its local volume (local volume 530(1)) to a map volume (e.g., map volume 520(1)). Such is the case regardless of the location of the metadata question, as is exemplified by the transfer of metadata 550(4) from local volume 530(2) to map volume 520(2). Further still, it is to be appreciated that, while such transfers are shown as occurring within a given partition, such need not strictly be the case (although for performance and simplicity, such may be desirable).

As will also be appreciated, scenarios may exist in which a comparatively small, inactive file increases in size and/or becomes more active. In such a case, the file's metadata (e.g., that Ada 550 (3)) can be transferred from its current map volume (e.g., map volume 520(2)) to an appropriate local volume (e.g., local volume 530 (2)). Here again, while such transfers are shown as occurring within a given partition, such need not strictly be the case (although for performance and simplicity, such may be desirable).

Figure 6:
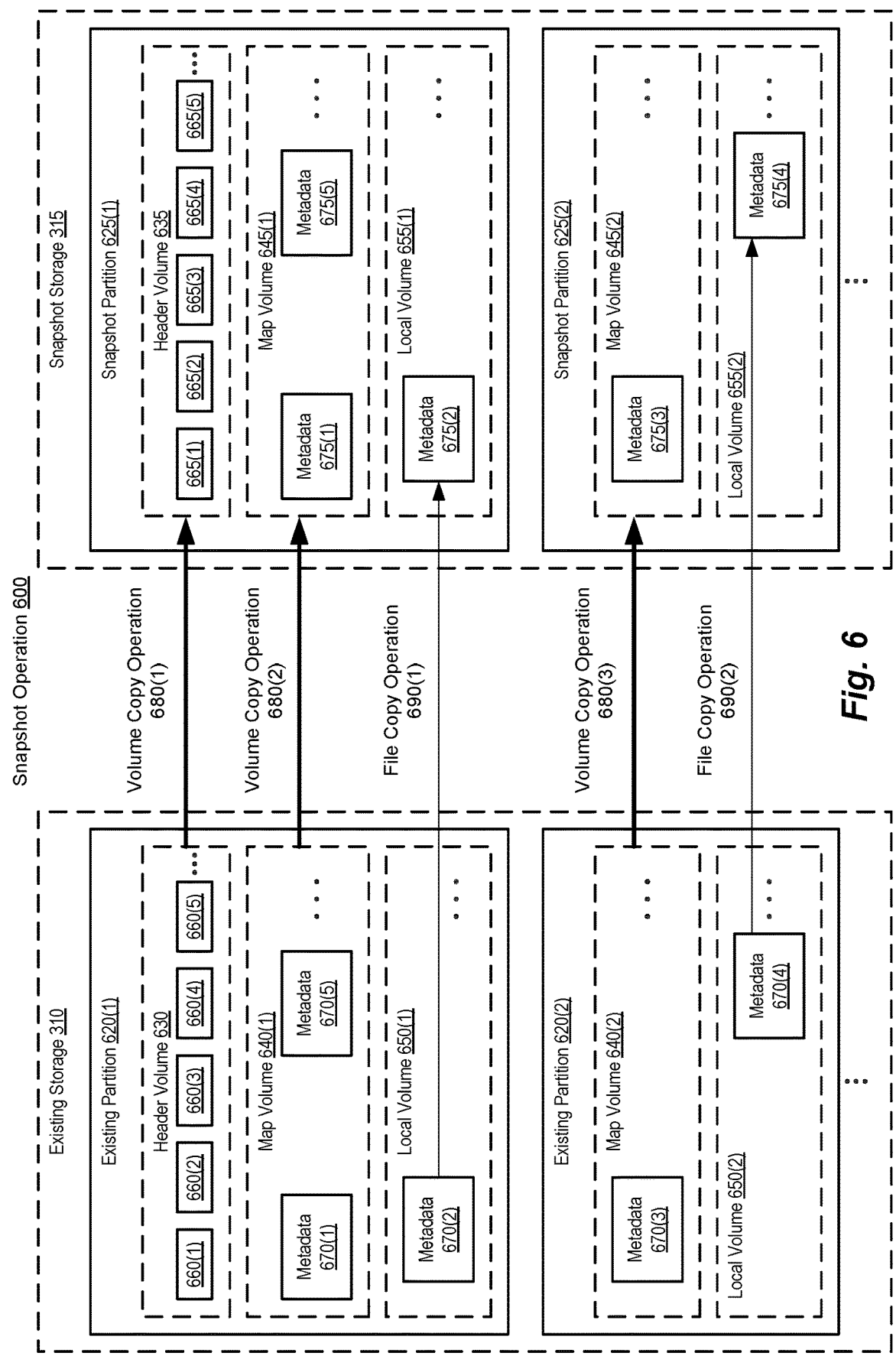
FIG. 6 is a simplified block diagram illustrating storage constructs and their interactions when performing an example snapshot operation in a storage system architecture according to embodiments of methods and systems such as those disclosed herein.

FIG. 6 is a simplified block diagram illustrating storage constructs and their interactions when performing an example snapshot operation in a storage system architecture according to embodiments of methods and systems such as those disclosed herein. FIG. 6 thus depicts various of the possible operations that can be included in a snapshot operation 600. Snapshot operation 600 provides an example of some of the advantages of methods and systems such as those described herein. The operations of snapshot operation 600 are performed to make a snapshot of information (e.g., in the scenario depicted in FIG. 6, copying header information and metadata information from existing storage 610 to snapshot storage 615).

As with various of the foregoing architectural and system depictions, existing storage 610 and snapshot storage 615 each include a number of partitions. To this end, existing storage 610 includes existing partitions 620(1)-(N) (of which existing partitions 620(1)-(2) are shown, and which are referred to in the aggregate as existing partitions 620), while snapshot storage 615 includes a number of snapshot partitions (depicted in FIG. 6 as snapshot partitions 625(1)-(N), and which are referred to in the aggregate as snapshot partitions 625, of which snapshot partitions 625(1)-(2) are shown). As before, existing partition 620(1) includes a header volume 630, while snapshot partition 625(1) includes a header volume 635. Existing partitions 620 also include corresponding map volumes (depicted in FIG. 6 as map volumes 640(1)-(N)) and local volumes (depicted in FIG. 6 as local volumes 650(1)-(N)). In a similar fashion, snapshot partitions 625(1)-(N) include corresponding map volumes (depicted in FIG. 6 as map volumes 645(1)-(N)) and local volumes (depicted in FIG. 6 as local volumes 655(1)-(N)).

Header volume 630 of existing partition 620(1) includes a number of headers (e.g., header files) that are depicted as including headers 660(1)-(N), of which headers 660(1)-(5) are shown. Similarly, header volume 635 of snapshot partition 625(1) also includes a number of headers (e.g., header files) that are depicted as including headers 665(1)-(N), of which headers 665(1)-(5) are shown. The map volume and local volume of each of existing partitions 620 each store metadata (e.g., one or more metadata files) corresponding to the files represented by headers 660. Such metadata is depicted in FIG. 6 as metadata 670(1)-(N), of which metadata 670(1)-(5) are shown, and which are referred to in the aggregate as metadata 670. Similarly, the map volume and local volume of each of snapshot partitions 625 each store copies of metadata (e.g., copies of one or more metadata files) corresponding to the files represented by headers 665. Such metadata is depicted in FIG. 6 as metadata 675(1)-(N), of which metadata 675(1)-(5) are shown, and which are referred to in the aggregate as metadata 675. As will be appreciated in light of the present disclosure, metadata 670 represents existing metadata (e.g., metadata files), while metadata 675 represents copies of such existing metadata.

As is depicted in FIG. 6, the aforementioned various possible operations include a number of volume copy operations (depicted in FIG. 6 as volume copy operations 680(1)-(N), of which volume copy operations 680(1)-(3) are shown, in which are referred to in the aggregate as volume copy operations 680) and a number of file copy operations (depicted in FIG. 6 as file copy operations 690(1)-(N), of which file copy operations 690(1)-(3) are shown, in which are referred to in the aggregate as file copy operations 690). As discussed earlier (and as detailed further in connection with the flow diagrams presented subsequently), the volume copy operations (e.g., volume copy operations 680) depicted are performed on header volumes (e.g., header volume 630) and map volumes (e.g., map volumes 640), given that such volumes are configured as file-based loop volumes. In so doing, the number of input/output (I/O) operations can be reduced for the metadata of comparatively small, infrequently-changing files, thereby reducing the relatively large number of I/O operations that would otherwise be necessitated by the relatively large number of small files.

By contrast, file copy operations (e.g., file copy operations 690) are performed on the metadata stored in local volumes 650 (e.g., metadata 670(2) and 670(4)), which individually copy the metadata stored in the local volumes, in a file-by-file manner. Such file copy operations are appropriate in situations in which the given files (and so, their metadata) are comparatively large, and so for a given volume, will not result in a large number of I/O operations. Further, the I/O operations can be tuned for such comparatively larger files' associated metadata in order to effect such I/O operations. Further still, by storing such comparatively larger files' associated metadata in local volumes, several metadata files can be copied at one time, concurrently, further improving performance.

Alternatively (or in combination therewith), it is, in certain embodiments desirable to store frequently-accessed files (and so, such files' metadata) in one or more local volumes, given that such frequent accesses (and, it can be assumed, changes) can be more readily captured.

Example Storage System Processes

Figure 7:
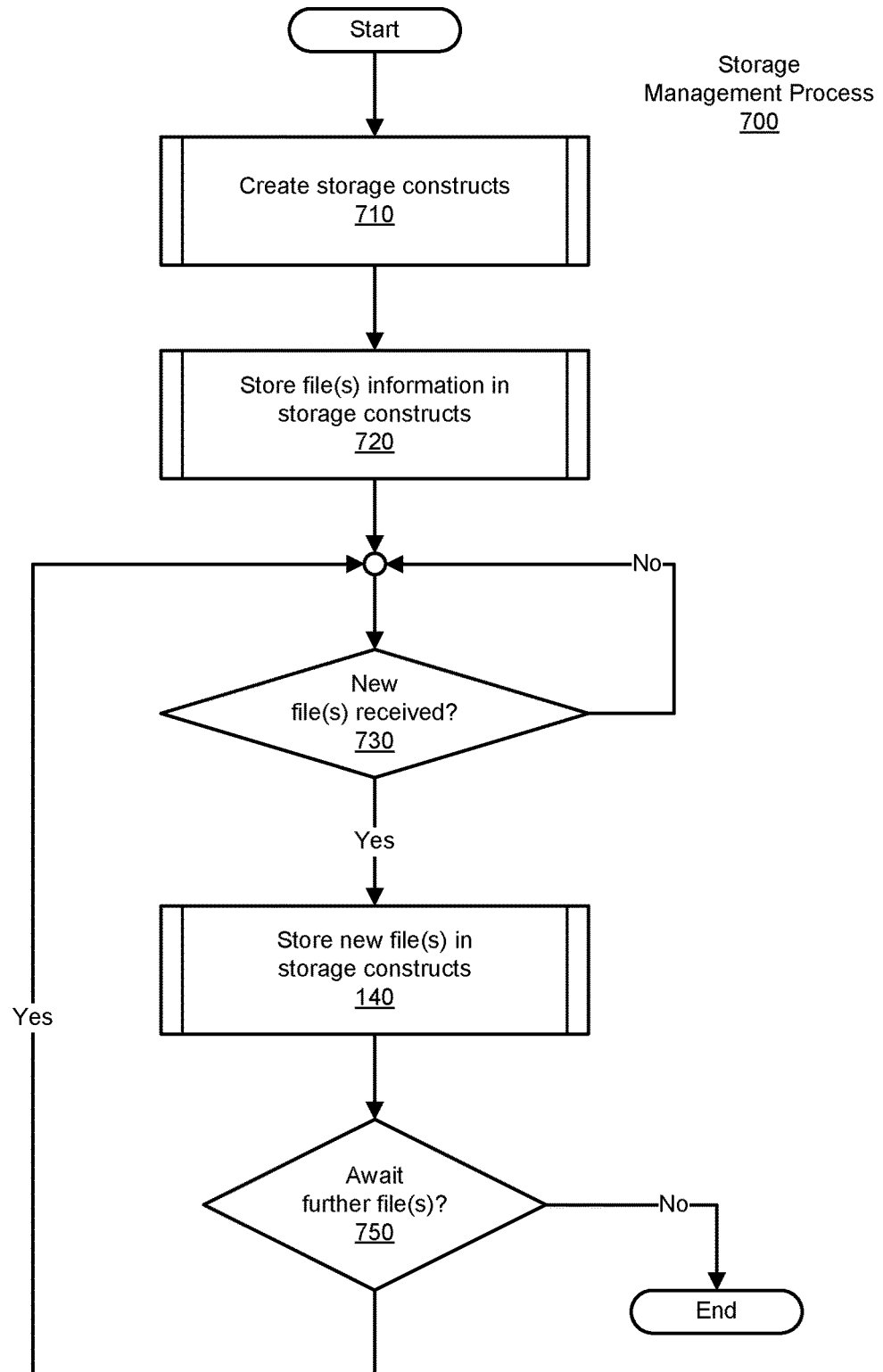
FIG. 7 is a flow diagram illustrating an example of a storage management process, according to embodiments of methods and systems such as those disclosed herein.

FIG. 7 is a flow diagram illustrating an example of a storage management process, according to embodiments of methods and systems such as those disclosed herein. FIG. 7 thus depicts a storage management process 700. Storage management process 700 begins with the creation of one or more storage constructs (710). As will be appreciated in light of the present disclosure, such creation can be accomplished, for example, by allocating storage constructs such as partitions, and therein, volumes in a storage area such as a user-space file system. An example of processes that include operations for creating one or more storage constructs, and which provide such functionality, is described in connection with FIGS. 8 and 9, subsequently. File information (e.g., header, metadata, and data) for each of the initial files being stored in the given file system are then stored in the storage constructs created (720). An example of processes that include operations for storing such information, and which provide such functionality, is described in connection with FIGS. 10 and 11, subsequently.

Storage management process 700 then awaits the receipt of one or more new files (730). Until such time as one or more new files are received, storage management process 700 iterates. Upon the receipt of one or more new files, storage management process 700 stores the new file(s) in the storage constructs created earlier. An example of processes that include operations for storing the relevant information for the files received, and which provide such functionality, is described in connection with FIGS. 12 and 13, subsequently.

A determination is then made as to whether storage management process 700 should await the receipt of additional files (750). In the case in which storage management process 700 is to await the receipt of additional files, storage management process 700 loops to awaiting such newly-received files (730). In the alternative, storage management process 700 concludes.

Figure 8:
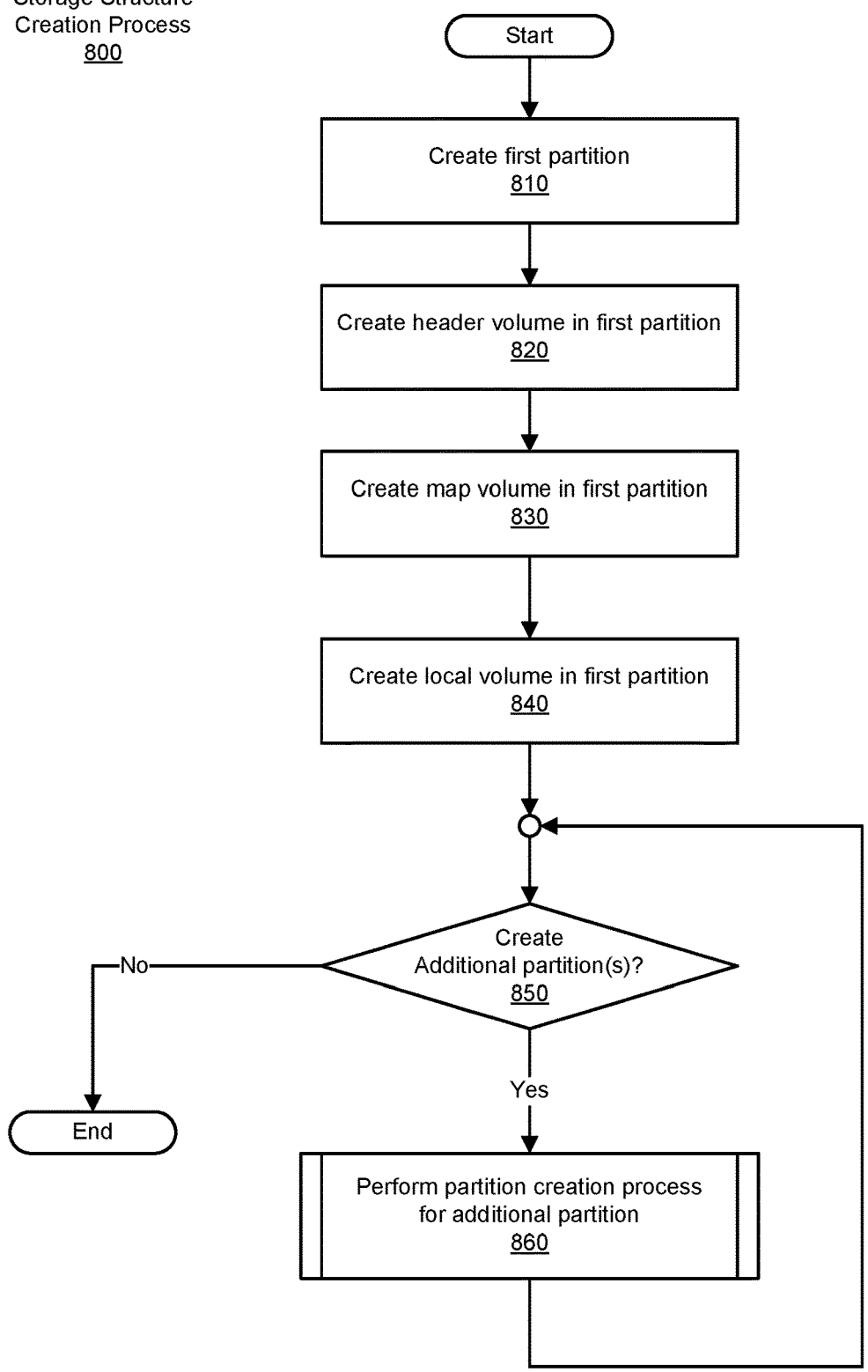
FIG. 8 is a flow diagram illustrating an example of a storage structure creation process, according to embodiments of methods and systems such as those disclosed herein.

FIG. 8 is a flow diagram illustrating an example of a storage structure creation process, according to embodiments of methods and systems such as those disclosed herein. FIG. 8 thus depicts a storage structure creation process 800. As noted earlier, the creation of such storage structures contemplates not only partitions, volumes, and files, but, in fact, any storage constructs of a hierarchical nature, in which certain of such storage constructs provide access to their constituent storage constructs and others of such storage constructs provide access not only to their constituent storage constructs, but to those storage constructs as a whole.

Storage structure creation process 800 begins, in the example depicted in FIG. 8, with the creation of a partition (e.g., a first partition of a number of partitions to be created) (810). Within this newly-created partition, storage structure creation process 800 proceeds with the creation of a header volume (820), a map volume (830), and a local volume (840). While not shown in storage structure creation process 800, other such creation operations can also be performed at this juncture to create other volumes within the given partition (e.g., one or more data volumes, storage space for other information (e.g., the aforementioned other files), and the like).

A determination is then made as to whether one or more additional partitions should be created (850). In the case in which further partitions should be created, storage structure creation process 800 proceeds with the creation of an additional partition (860). An example of a process that includes operations for the creation of an additional partition, and which provides such functionality, is described in connection with FIG. 9, subsequently. Once any requisite additional partitions have been created (850), storage structure creation process 800 concludes.

Figure 9:
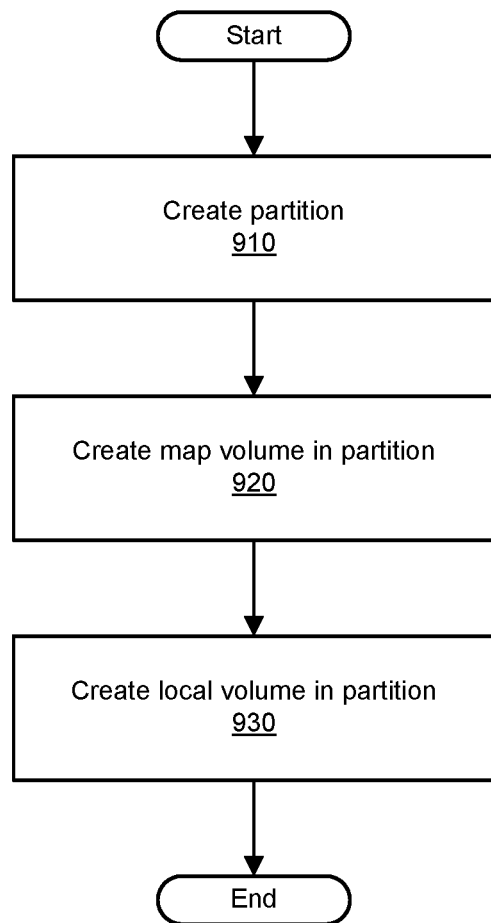
FIG. 9 is a flow diagram illustrating an example of a partition creation process, according to embodiments of methods and systems such as those disclosed herein.

FIG. 9 is a flow diagram illustrating an example of a partition creation process, according to embodiments of methods and systems such as those disclosed herein. FIG. 9 thus depicts a partition creation process 900. Partition creation process 900 begins, in the example depicted in FIG. 9, with the creation of the partition in question (910). Within this newly-created partition, partition creation process 900 proceeds with the creation of a map volume (920) and a local volume (930). While not shown in partition creation process 900, other such creation operations can also be performed at this juncture to create other volumes within the given partition (e.g., one or more data volumes). Further in this regard, it will be appreciated that, while the examples provided herein discuss partitions and their contents in terms of a single map volume and a single local volume being included therein, such need not strictly be the case, and so, certain of such partitions may include more than one of either (or none of one or the other) in other implementations.

Figure 10:
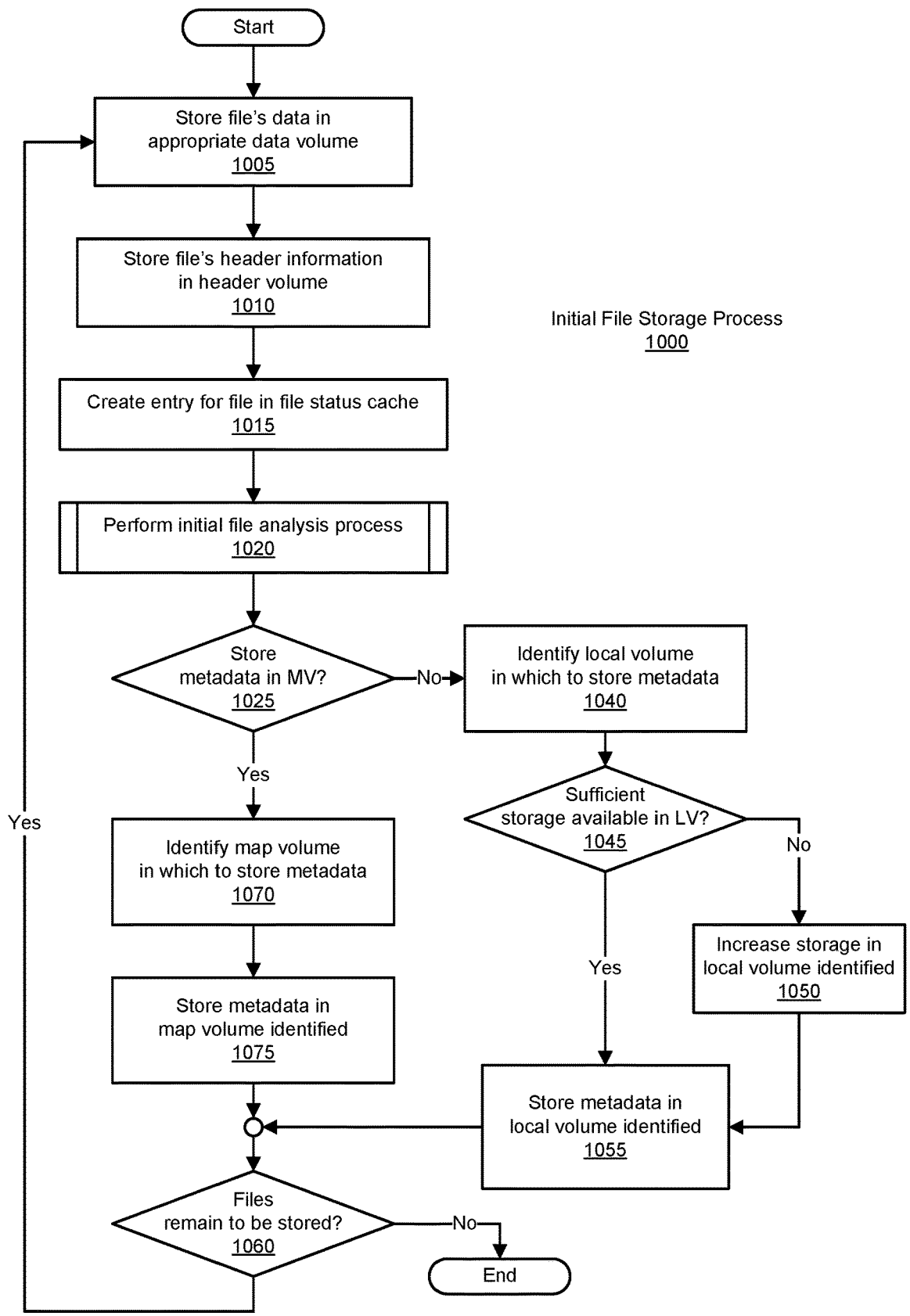
FIG. 10 is a flow diagram illustrating an example of a initial file storage process, according to embodiments of methods and systems such as those disclosed herein.

FIG. 10 is a flow diagram illustrating an example of a initial file storage process, according to embodiments of methods and systems such as those disclosed herein. FIG. 10 thus depicts an initial file storage process 1000. Initial file stored process 1000 provides an example of the initial storage of files (e.g., by way of storage of the files' headers, metadata, and data (e.g., data segments) in a user-space file system), as might be the case in which an application's files are copied to ("dumped in") the user-space file system. In so doing, the application's internal backup operations can be used to "dump" such files to a user-space file system, and so seamlessly take advantage of the data the deduplication facilities provided by such a file system.

Initial file storage process 1000 begins with the storage of the given file's data in the appropriate data volume (1005). The file's header information is stored in a header file in the header volume (1010). As part of initial file stored process 1000, and entry is created for the file in the storage system's file status cache (1015). It will be appreciated that creation of a file status cache entry for file includes storing the appropriate information in newly-created entry. At this juncture, and initial file analysis processes performed (1020). An example of a process that includes operations for initial file analysis, and which provides such functionality, is described in connection with FIG. 11, subsequently.

Based on the aforementioned initial file analysis, a determination is made as to whether the file's metadata should be stored in a map volume (1025). In the examples provided herein, the determination and its results are based on the size of the file in question (and so, its metadata). As will be appreciated in light of the present disclosure, such files (and their associated information), having just been received, have no history as to the frequency of their access, in the examples presented. That said, if such access frequency information were available from the application in question, further analysis in this regard, in the manner discussed subsequently, could be performed.

In the case in which the file's metadata is not to be stored in a map volume, in the examples provided herein, the file's metadata will be stored in the appropriate local volume. First, the local volume in which the file's metadata is to be stored is identified (1040). Once the appropriate local volume has been identified, a determination is made as to whether sufficient storage is available in that local volume (1045). For example, such a determination can examine how the amount of unused storage space in the given volume compares to a threshold of the available storage space for the local volume. If additional storage space is needed to store the metadata in the local volume, the local volume's storage space is increased (1050). In the alternative (or in addition to), the size of each local volume can also be monitored by a daemon that constantly checks the size of each local volume, and increases a given local volume's size, if it is determined that the given local volume's free space has fallen below a certain threshold amount or percentage. In any event, there (now) being sufficient storage space in the local volume identified, the metadata in question is stored therein (1055).

A determination is then made as to whether various information for additional files remains to be stored (1060). If further files remain to be stored, initial file stored process 1000 loops to storing the next file's data in the appropriate data volume (1005), and initial file stored process 1000 proceeds for that file's information. In the alternative, initial file stored process 1000 concludes.

Returning now to the results of the initial file analysis process, if a determination is made that the metadata should be stored in a map volume (1035), initial file sort process 1000 proceeds to identifying the map volume in which the metadata is to be stored (1070). Given that map volumes, due to their file-based loop volume characteristics, can be manipulated as a whole, identification of the appropriate map volume in this regard includes a determination as to whether sufficient storage space exists in the map volume being considered. By contrast, local volumes, being file-based, can change in the amount of storage space available, given that it is the constituent files thereof that are being accessed. Once the appropriate map volume in which to store the file's metadata has been identified, initial file stored process 1000 proceeds with the storage of that metadata in the map volume identified (1075).

As before, a determination is then made as to whether various information for additional files remains to be stored (1060). If further files remain to be stored, initial file stored process 1000 loops to storing the next file's data in the appropriate data volume (1005), and initial file stored process 1000 proceeds for that file's information. In the alternative, initial file stored process 1000 concludes.

Figure 11:
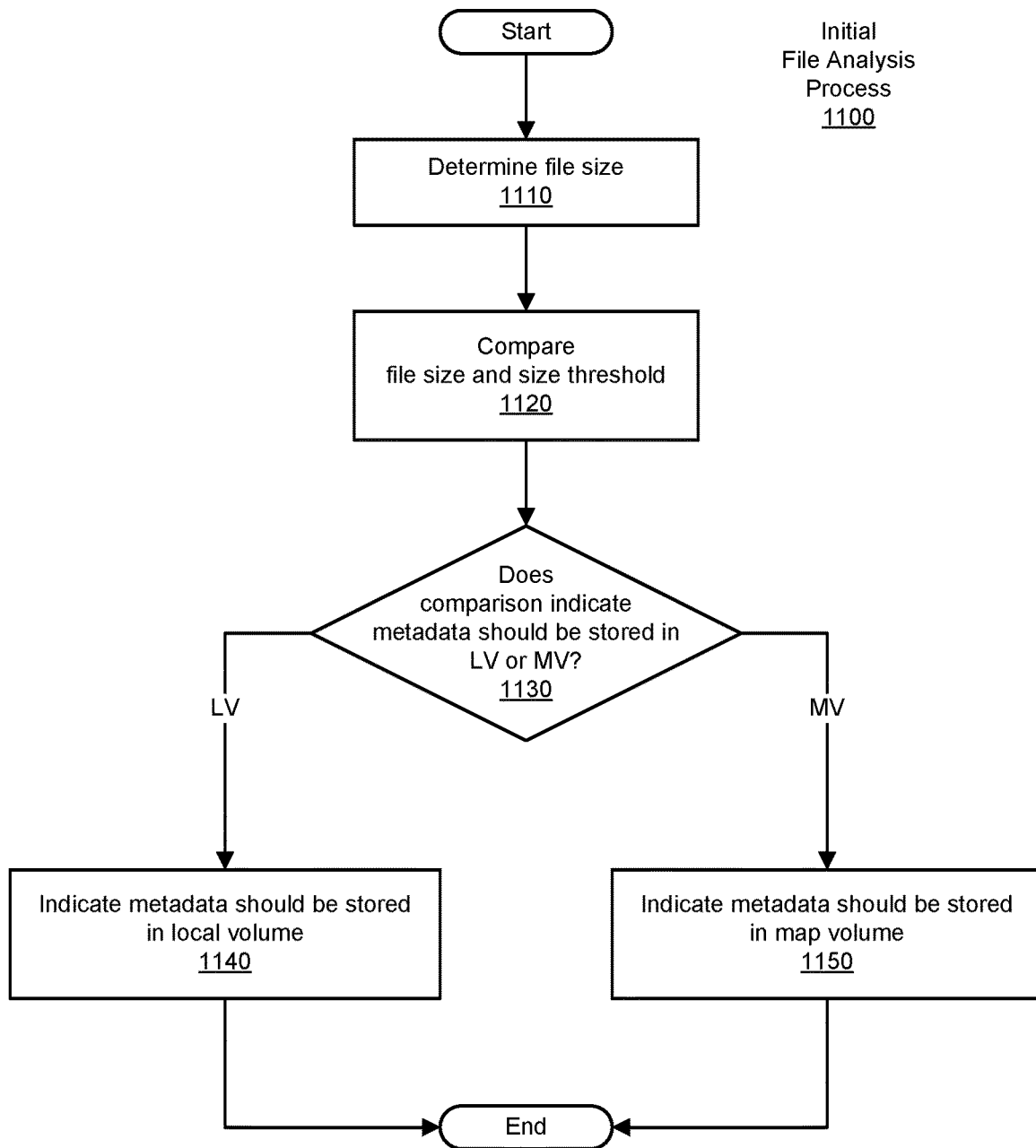
FIG. 11 is a flow diagram illustrating an example of a initial file analysis process, according to embodiments of methods and systems such as those disclosed herein.

FIG. 11 is a flow diagram illustrating an example of a initial file analysis process, according to embodiments of methods and systems such as those disclosed herein. FIG. 11 thus depicts an initial file analysis process 1100. Initial file analysis process 1100 begins by determining the size of the file in question (from which the size of the file's metadata can be extrapolated) (1110). It will be appreciated that, in certain embodiments, the size of the file's metadata can be determined directly and used instead. The file size (or metadata size) thus determined is then compared with a size threshold (1120). As will be appreciated in light of the present disclosure, such a comparison is contemplated as being any of a "greater than," "less than," "less than or equal to," or "greater than or equal to" relationship. Moreover, the size threshold employed is chosen to provide acceptable performance, such that metadata stored in local volumes represents sufficiently large files and metadata stored in map volumes represents sufficiently small files. In so doing, such analysis can also take into consideration the expected level of access frequency (activity) of a given file, should such information be available.

Based on the aforementioned comparison, initial file analysis process 1100 makes a determination as to whether the metadata in question should be stored in a local volume or a map volume (1130). In the case in which comparison indicates that the metadata in question should be stored in a local volume, an indication to this effect is provided (1140). Alternatively, if the comparison indicates that the metadata in question should be stored in a map volume, an indication to that effect is provided (1150). Initial file analysis process 1100 then concludes. As will be appreciated, while the storage constructs described herein result in the structure of initial file analysis process 1100, such need not necessarily be the case. For example, if a hierarchy of storage constructs is employed in which more than two storage construct types are available, the structure of initial file analysis process 1100, for example, would be modified to comprehend such additional possibilities. Thus, while the indications of file storage described herein are in terms of local/map volumes, other embodiments are possible. For example, a series of threshold can be used to segregate files into a number of groupings, in which each such group is associated with a given level of aggregation, storage performance, and the like.

Figure 12:
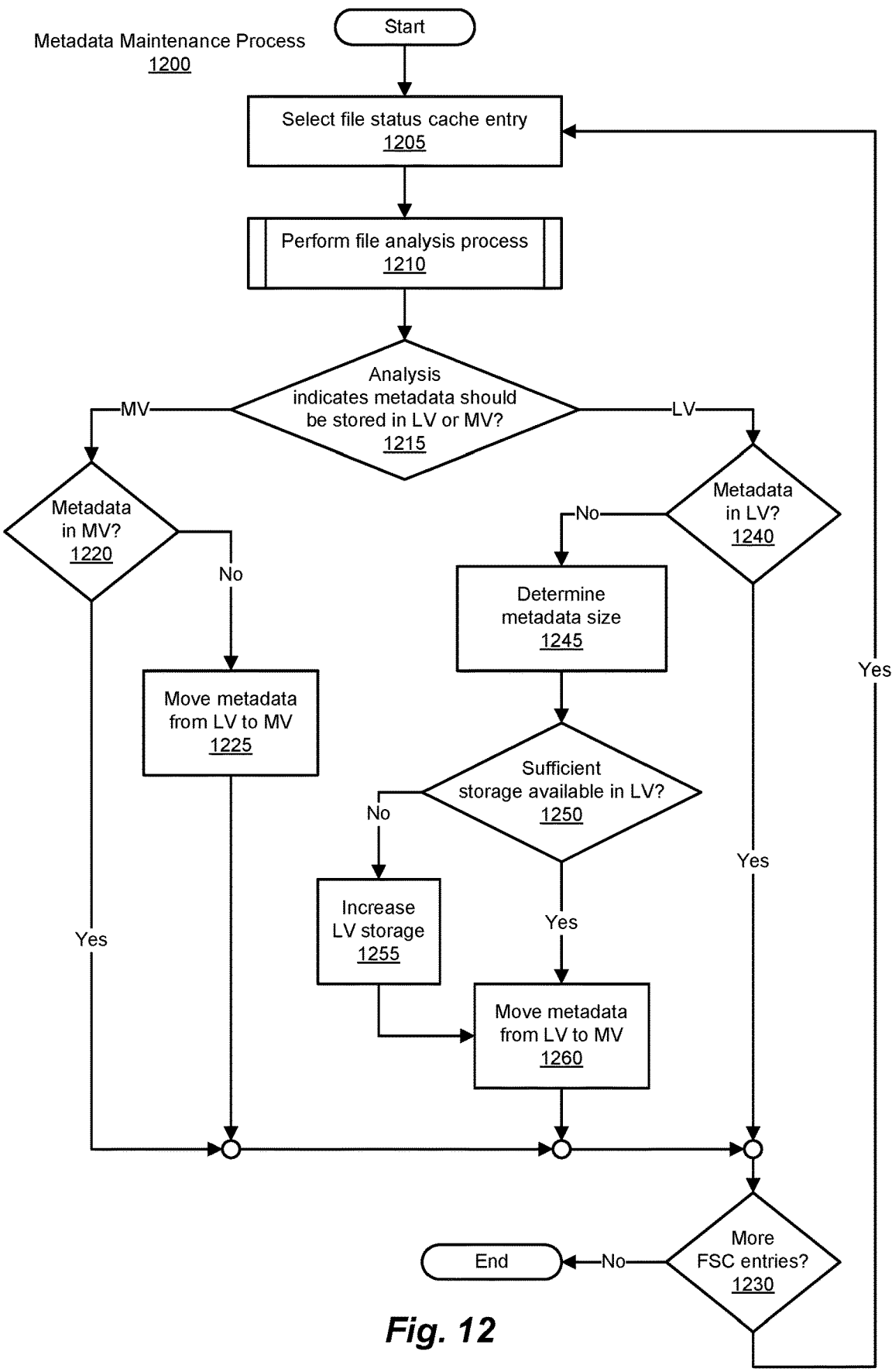
FIG. 12 is a flow diagram illustrating an example of a metadata maintenance process, according to embodiments of methods and systems such as those disclosed herein.

FIG. 12 is a flow diagram illustrating an example of a metadata maintenance process, according to embodiments of methods and systems such as those disclosed herein. FIG. 12 thus depicts a metadata maintenance process 1200. Metadata maintenance process 1200 depicts an embodiment in which a daemon or other process cycles through file status cache (FSC) entries (e.g., file status cache entries 565 of file status cache (FSC) 560 of FIG. 5). As noted elsewhere herein, other approaches to maintaining metadata storage according to systems such as those described herein can be employed. For example, such maintenance processes can, possibly separately, analyze the size of files (or their metadata) upon such files being written, while also tallying accesses (right operations and/or read operations) occurring during a such files' use. In that regard, rather than a background daemon that constantly cycles through the file status cache entries, such a determination can be accomplished by checking a given file after each I/O operation (or, alternatively, by checking for changes in file size (e.g., above a certain amount)). However, so doing may not address the case of infrequently accessed files. To address this aspect, the storage system can assume that all files that are comparatively small are accessed infrequently, unless the given file proves to be active. In such an embodiment, files subject to write operations are examined as to their size (or the change in size), while files subject to any I/O operation (whether a read operation or a write operation) are examined as to the frequency with which such files are accessed. These and other equivalent analyses are intended to be comprehended by the present disclosure.

Metadata maintenance process 1200, in the embodiment depicted, begins with the selection of a file status cache entry (1205). File analysis on the file identified by the file status cache entry (which may include analysis of the file status cache entry) is then performed (1210). An example of a process that includes operations for such file analysis, and which provides such functionality, is described in connection with FIG. 13, subsequently. As described subsequently, such analysis can include the size of the file (or metadata) in question and the frequency with which the file (or metadata) in question is accessed. As noted elsewhere, a file's size (or that of its metadata) and the frequency with which the given file is accessed (and/or other characteristics) can, in one embodiment, be combined into a metadata score. Such a metadata score can then be used to make determinations as to which storage construct the metadata in question is to be stored.

A determination is then made, based on this analysis, as to whether the analysis performed indicates that the file's metadata should be stored in a local volume or a map volume (1215). In the case in which the analysis indicates that the metadata in question should be stored in a map volume, metadata maintenance process 1200 proceeds to a determination as to whether the metadata in question is already stored in a map volume (1220). In the case in which the metadata is not stored in a map volume (and so, in the presently described implementation, is stored in a local volume), metadata maintenance process 1200 proceeds with moving the metadata in question from the local volume in which it is stored, to in appropriately-selected map volume (1225).

Metadata maintenance process 1200, having determined that the metadata in question is already stored in a map volume or having moved the metadata to an appropriate map volume, proceeds with a determination as to whether additional file status cache entries remain to be examined in the current cycle through the file status cache (1230). It will be appreciated that, typically, implementation of metadata maintenance process 1200 by a daemon, for example, will simply cycle through the file status cache continuously, checking for changes in status of the files tracked thereby. In the present implementation, if additional file status cache entries remain to be examined, metadata maintenance process 1200 loops to the selection of the next file status cache entry to be examined (1205). Alternatively, metadata maintenance process 1200 concludes.

Returning to the determination as to whether the file analysis performed indicates that the metadata should be stored in a local volume (415). Metadata maintenance process 1200 proceeds to a determination as to whether the metadata in question is already stored in local volume (1240). In the case in which the metadata in question is already stored in a local volume, metadata maintenance process 1200 proceeds to the aforementioned determination as to whether further file status cache entries remain to be examined (1230) and either iteration to the selection of the next file status cache entry (1205) or conclusion of metadata maintenance process 1200.

Figure 13:
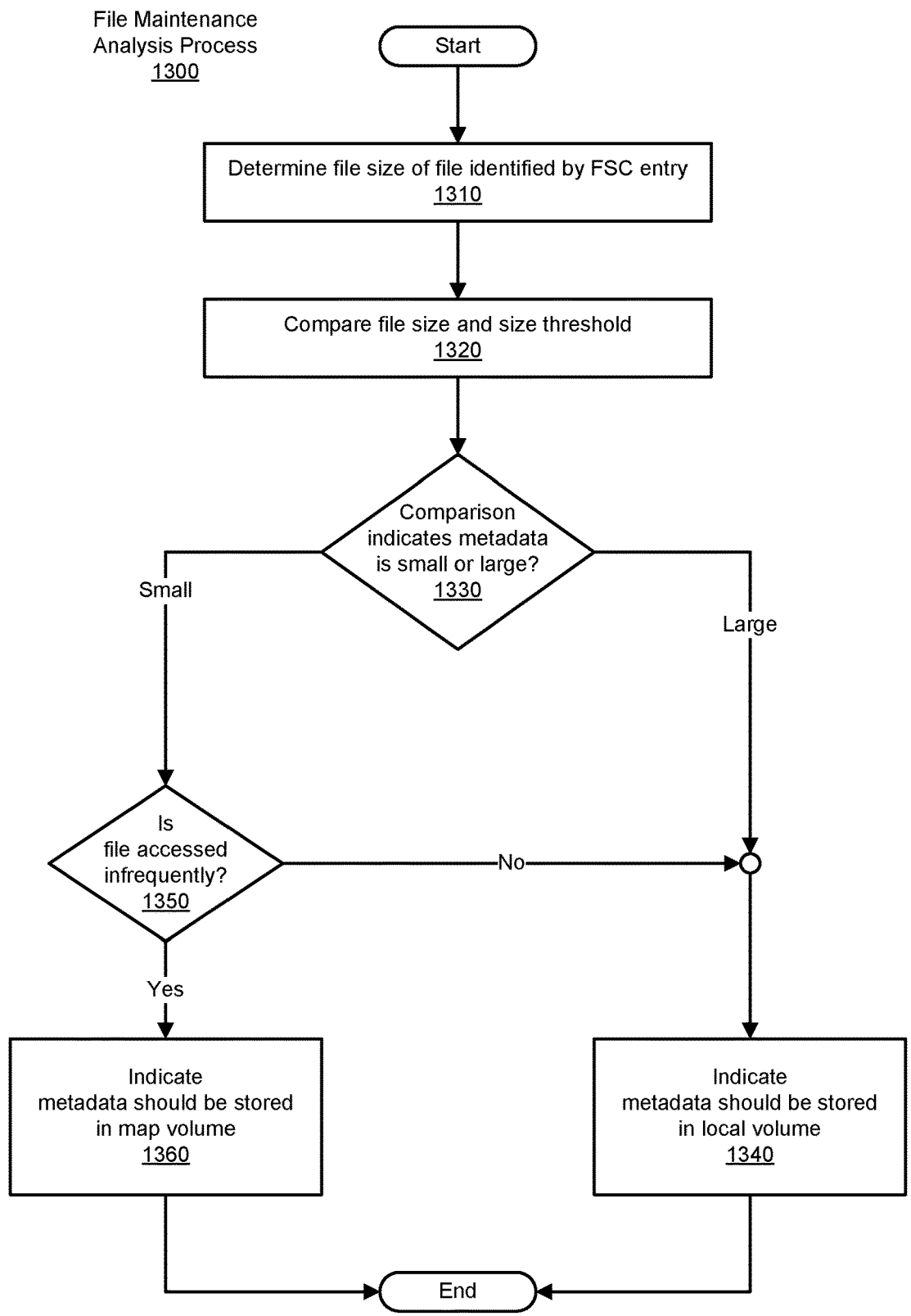
FIG. 13 is a flow diagram illustrating an example of a file maintenance analysis process, according to embodiments of methods and systems such as those disclosed herein.

FIG. 13 is a flow diagram illustrating an example of a file maintenance analysis process, according to embodiments of methods and systems such as those disclosed herein. FIG. 13 thus depicts a file maintenance analysis process 1300. File maintenance analysis process 1300 is comparable to initial file analysis process 1100 of FIG. 11 with respect to its analysis of file (metadata) size versus the given size threshold. As noted earlier, such size threshold can be tuned to provide acceptable levels of I/O operations. As also noted, such analysis of files (metadata) can include other criteria. In the case of file maintenance analysis process 1300, an example of such other criteria is the consideration taken of the frequency with which files (metadata) are accessed. As will be apparent in light of the present disclosure, other criteria will also present themselves as useful in this regard (e.g., file type (e.g., based on the application(s) accessing the given file(s)), the time that has elapsed since a given file was accessed, and other such criteria).

File maintenance analysis process 1300, in one embodiment, begins with a determination as to the file size (or metadata size) of the file identified by the given file status cache entry (1310). The file (metadata) size thus determined is then compared to a size threshold, for example, in the manner discussed in connection with FIG. 11 (1320). As before, then, a determination as to whether the given file (metadata) is comparatively small or large (1330). If a given file (metadata) is determined to be comparatively large, file maintenance analysis process 1300 indicates that the metadata in question should be stored in a local volume (1340). File maintenance analysis process 1300 then concludes.

In the alternative, in the embodiment depicted in FIG. 13, if the file (metadata) in question is determined to be comparatively small (1330), a determination is then made as to whether the file (metadata) in question is accessed infrequently (1350). Such a determination can, in one embodiment, be a comparison of an access frequency of the file in question (or its metadata) to an access frequency threshold. If a determination is made that the given file (metadata), while comparatively small, is accessed frequently (e.g., the file's/metadata's access frequency meets (or exceeds) the given access frequency threshold), file maintenance analysis process 1300 proceeds to making an indication that the metadata in question should be stored in a local volume (1340), after which, file maintenance analysis process 1300 concludes. Alternatively, if the file (metadata) in question is found to be comparatively small and is infrequently accessed (1350), file maintenance analysis process 1300 proceeds with indicating that the metadata in question should be stored in a map value (1360), after which, file maintenance analysis process 1300 concludes.

Figure 14:
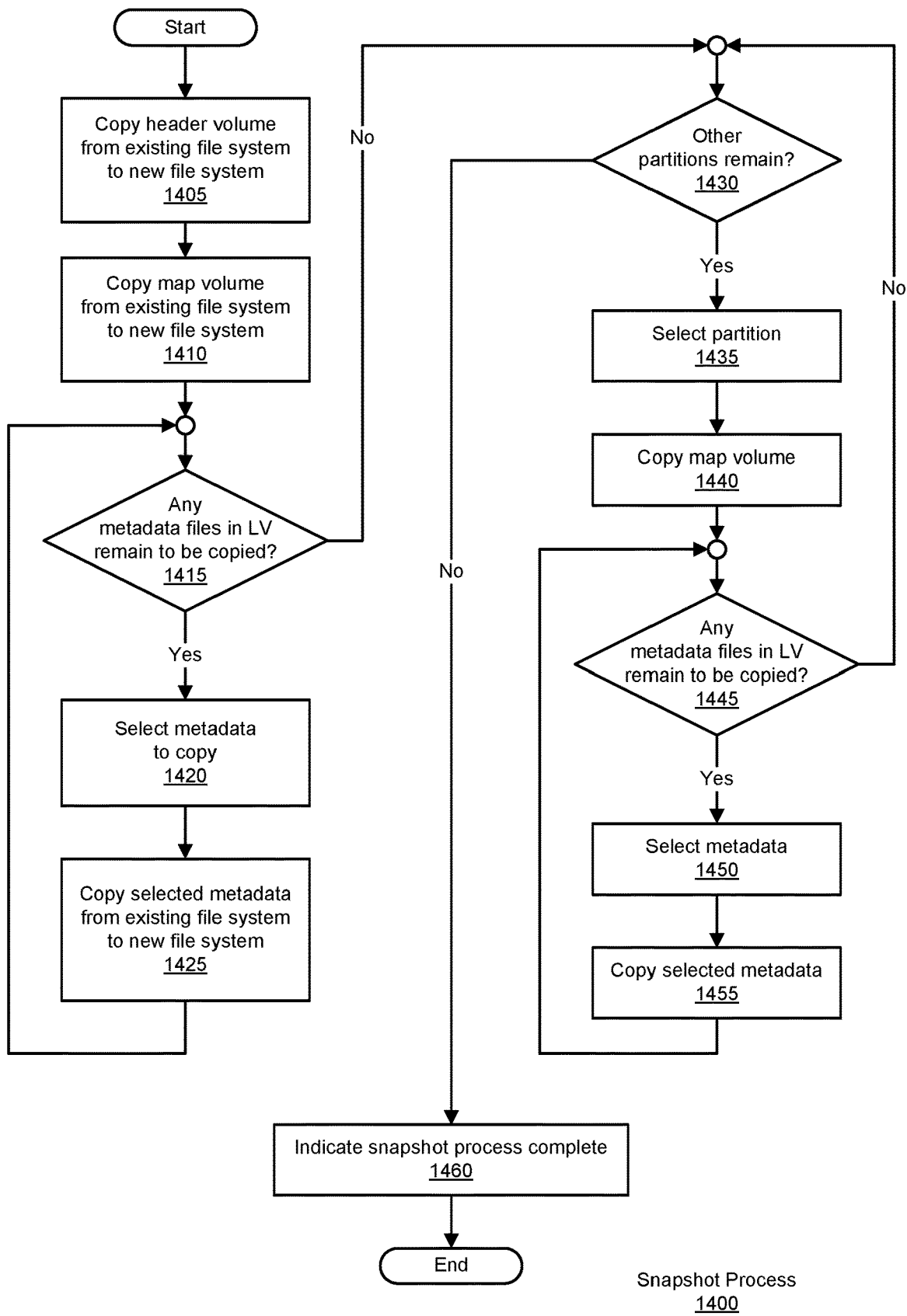
FIG. 14 is a flow diagram illustrating an example of a snapshot process, according to embodiments of methods and systems such as those disclosed herein.

FIG. 14 is a flow diagram illustrating an example of a snapshot process, according to embodiments of methods and systems such as those disclosed herein. FIG. 14 thus depicts a snapshot process 1400, which illustrates various of the operations shown as being included in snapshot operation 600 of FIG. 6. Snapshot process 1400, in the embodiment shown, begins with the copying of the existing storage's header volume to a new file system in snapshot storage (1405). Given that such a header volume is a file-based loop volume, the header volume can be copied in its entirety. The existing partition's map volume is then copied to the new file system (1410). Here again, the map volume being a file-based loop volume, the map volume can be copied in its entirety.

By contrast, metadata (e.g., metadata files) stored in the partition's local volume are copied individually. To that end, snapshot process 1400 makes a determination as to whether any metadata files in the local volume remain to be copied (415). If one or more metadata files in the partition's local volume remain to be copied, snapshot process 1400 proceeds with selecting the metadata (e.g., metadata files) to be copied (1420). The selected metadata (metadata files) are then copied from the existing file system to the new file system (1425). The process of copying metadata files in the partition's local volume continues in this manner until the desired metadata (metadata files) have been copied to the new file system in snapshot storage.

One such copying is complete (1415), snapshot process 1400 makes a determination as to whether other partitions subject to the snapshot operation remain (1430). If further partitions remain to be copied, the next partition to be copied is selected (1435). The selected partition's map volume is then copied (1440). In a manner similar to that just discussed, a determination is made as to whether any metadata (metadata files) stored in the partition's local volume remain to be copied (1445). If one or more metadata files in the partition's local volume remain to be copied, snapshot process 1400 proceeds with selecting the next metadata (metadata files) to copy (1450), and performs copying thereof to the new file system (1455). This process continues in this manner until the desired metadata (metadata files) have been copied to the new file system in snapshot storage.

Once no further partitions subject to the snapshot operation remain (1430), snapshot process 1400 proceeds with indicating that the snapshot process has completed (1460). Snapshot process 1400 then concludes.

An Example Computing and Network Environment

As noted, the systems described herein can be implemented using a variety of computer systems and networks. The following illustrates an example configuration of a computing device such as those described herein. The computing device may include one or more processors, a random access memory (RAM), communication interfaces, a display device, other input/output (I/O) devices (e.g., keyboard, trackball, and the like), and one or more mass storage devices (e.g., optical drive (e.g., CD, DVD, or Blu-ray), disk drive, solid state disk drive, non-volatile memory express (NVME) drive, or the like), configured to communicate with each other, such as via one or more system buses or other suitable connections. While a single system bus is illustrated for ease of understanding, it should be understood that the system buses may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, or the like.

Such CPUs are hardware devices that may include a single processing unit or a number of processing units, all of which may include single or multiple computing units or multiple cores. Such a CPU may include a graphics processing unit (GPU) that is integrated into the CPU or the GPU may be a separate processor device. The CPU may be implemented as one or more microprocessors, microcomputers, microcontrollers, digital signal processors, central processing units, graphics processing units, state machines, logic circuitries, and/or any devices that manipulate signals based on operational instructions. Among other capabilities, the CPU may be configured to fetch and execute computer-readable instructions stored in a memory, mass storage device, or other computer-readable storage media.

Memory and mass storage devices are examples of computer storage media (e.g., memory storage devices) for storing instructions that can be executed by the processors 502 to perform the various functions described herein. For example, memory can include both volatile memory and non-volatile memory (e.g., RAM, ROM, or the like) devices. Further, mass storage devices may include hard disk drives, solid-state drives, removable media, including external and removable drives, memory cards, flash memory, floppy disks, optical disks (e.g., CD, DVD, Blu-ray), a storage array, a network attached storage, a storage area network, or the like. Both memory and mass storage devices may be collectively referred to as memory or computer storage media herein and may be any type of non-transitory media capable of storing computer-readable, processor-executable program instructions as computer program code that can be executed by the processors as a particular machine configured for carrying out the operations and functions described in the implementations herein.

The computing device may include one or more communication interfaces for exchanging data via a network. The communication interfaces can facilitate communications within a wide variety of networks and protocol types, including wired networks (e.g., Ethernet, DOCSIS, DSL, Fiber, USB, etc.) and wireless networks (e.g., WLAN, GSM, CDMA, 802.11, Bluetooth, Wireless USB, ZigBee, cellular, satellite, etc.), the Internet and the like. Communication interfaces can also provide communication with external storage, such as a storage array, network attached storage, storage area network, cloud storage, or the like.

The display device may be used for displaying content (e.g., information and images) to users. Other I/O devices may be devices that receive various inputs from a user and provide various outputs to the user, and may include a keyboard, a touchpad, a mouse, a printer, audio input/output devices, and so forth. The computer storage media, such as memory 504 and mass storage devices, may be used to store software and data, such as, for example, an operating system, one or more drivers (e.g., including a video driver for a display such as display 150), one or more applications, and data. Examples of such computing and network environments are described below with reference to FIGS. 15 and 16.

Figure 15:
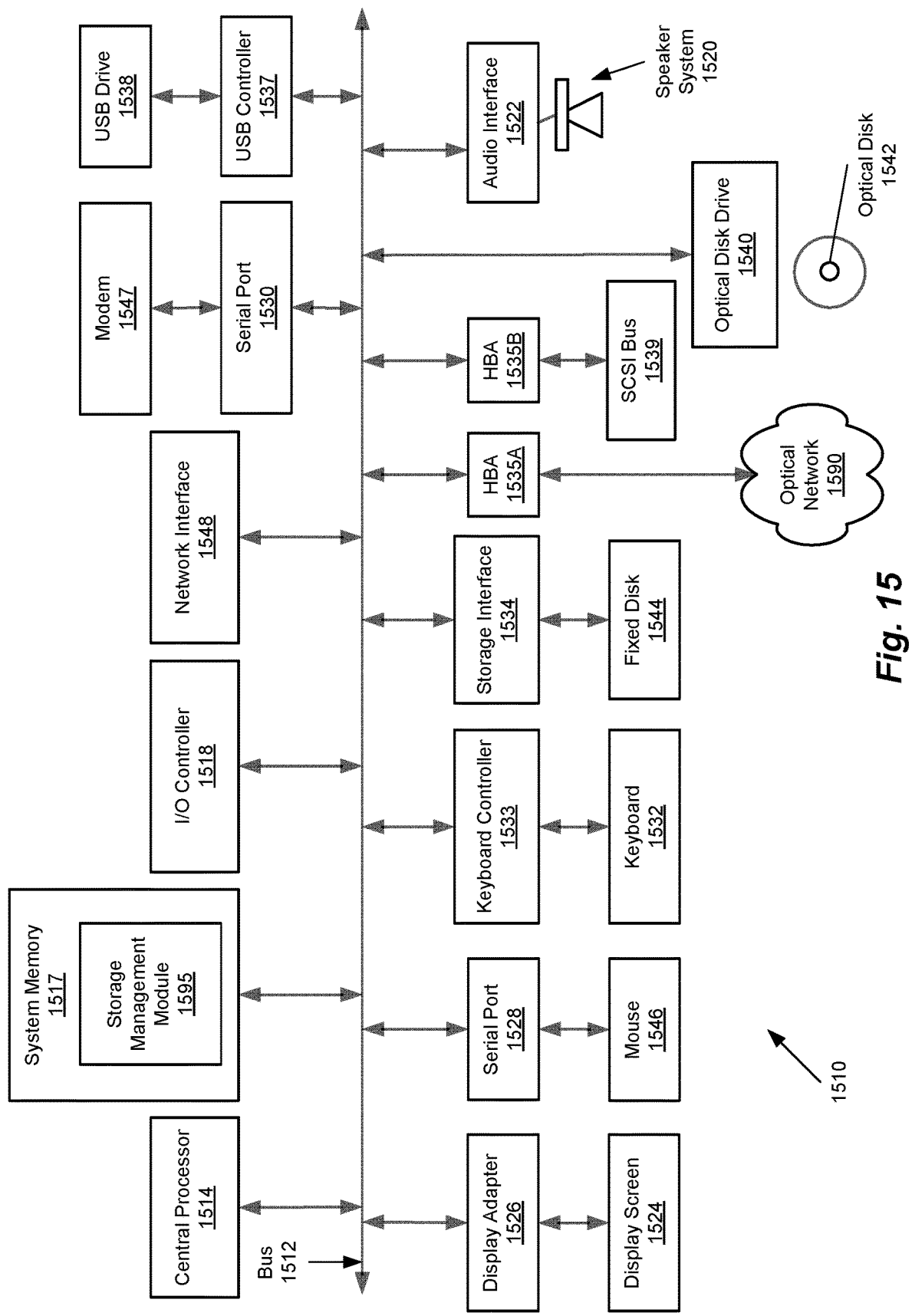
FIG. 15 is a simplified block diagram illustrating components of an example computer system suitable for implementing embodiments of the present disclosure, according to embodiments of methods and systems such as those disclosed herein.

FIG. 15 depicts a block diagram of a computer system 1510 suitable for implementing aspects of the systems described herein. Computer system 1510 includes a bus 1512 which interconnects major subsystems of computer system 1510, such as a central processor 1514, a system memory 1517 (typically RAM, but which may also include ROM, flash RAM, or the like), an input/output controller 1518, an external audio device, such as a speaker system 1520 via an audio output interface 1522, an external device, such as a display screen 1524 via display adapter 1526, serial ports 1528 and 1530, a keyboard 1532 (interfaced with a keyboard controller 1533), a storage interface 1534, a USB controller 1537 operative to receive a USB drive 1538, a host bus adapter (HBA) interface card 1535A operative to connect with a optical network 1590, a host bus adapter (HBA) interface card 1535B operative to connect to a SCSI bus 1539, and an optical disk drive 1540 operative to receive an optical disk 1542. Also included are a mouse 1546 (or other point-and-click device, coupled to bus 1512 via serial port 1528), a modem 1547 (coupled to bus 1512 via serial port 1530), and a network interface 1548 (coupled directly to bus 1512).

Bus 1512 allows data communication between central processor 1514 and system memory 1517, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1510 are generally stored on and accessed from a computer-readable storage medium, such as a hard disk drive (e.g., fixed disk 1544), an optical drive (e.g., optical drive 1540), a universal serial bus (USB) controller 1537, or other computer-readable storage medium.

Storage interface 1534, as with the other storage interfaces of computer system 1510, can connect to a standard computer-readable medium for storage and/or retrieval of information, such as a fixed disk drive 1544. Fixed disk drive 1544 may be a part of computer system 1510 or may be separate and accessed through other interface systems. Modem 1547 may provide a direct connection to a remote server via a telephone link or to the Internet via an internet service provider (ISP). Network interface 1548 may provide a direct connection to a remote server via a direct network link to the Internet via a POP (point of presence). Network interface 1548 may provide such connection using wireless techniques, including digital cellular telephone connection, Cellular Digital Packet Data (CDPD) connection, digital satellite data connection or the like. Also depicted as part of computer system 1510 is a storage management module 1595, which is resident in system memory 1517 and provides functionality and operations comparable to the storage management processes described earlier herein.

Many other devices or subsystems (not shown) may be connected in a similar manner (e.g., document scanners, digital cameras and so on). Conversely, all of the devices shown in FIG. 15 need not be present to practice the systems described herein. The devices and subsystems can be interconnected in different ways from that shown in FIG. 15. The operation of a computer system such as that shown in FIG. 15 will be readily understood in light of the present disclosure. Code to implement portions of the systems described herein can be stored in computer-readable storage media such as one or more of system memory 1517, fixed disk 1544, optical disk 1542, or USB drive 1538. The operating system provided on computer system 1510 may be WINDOWS, UNIX, LINUX, IOS, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 16:
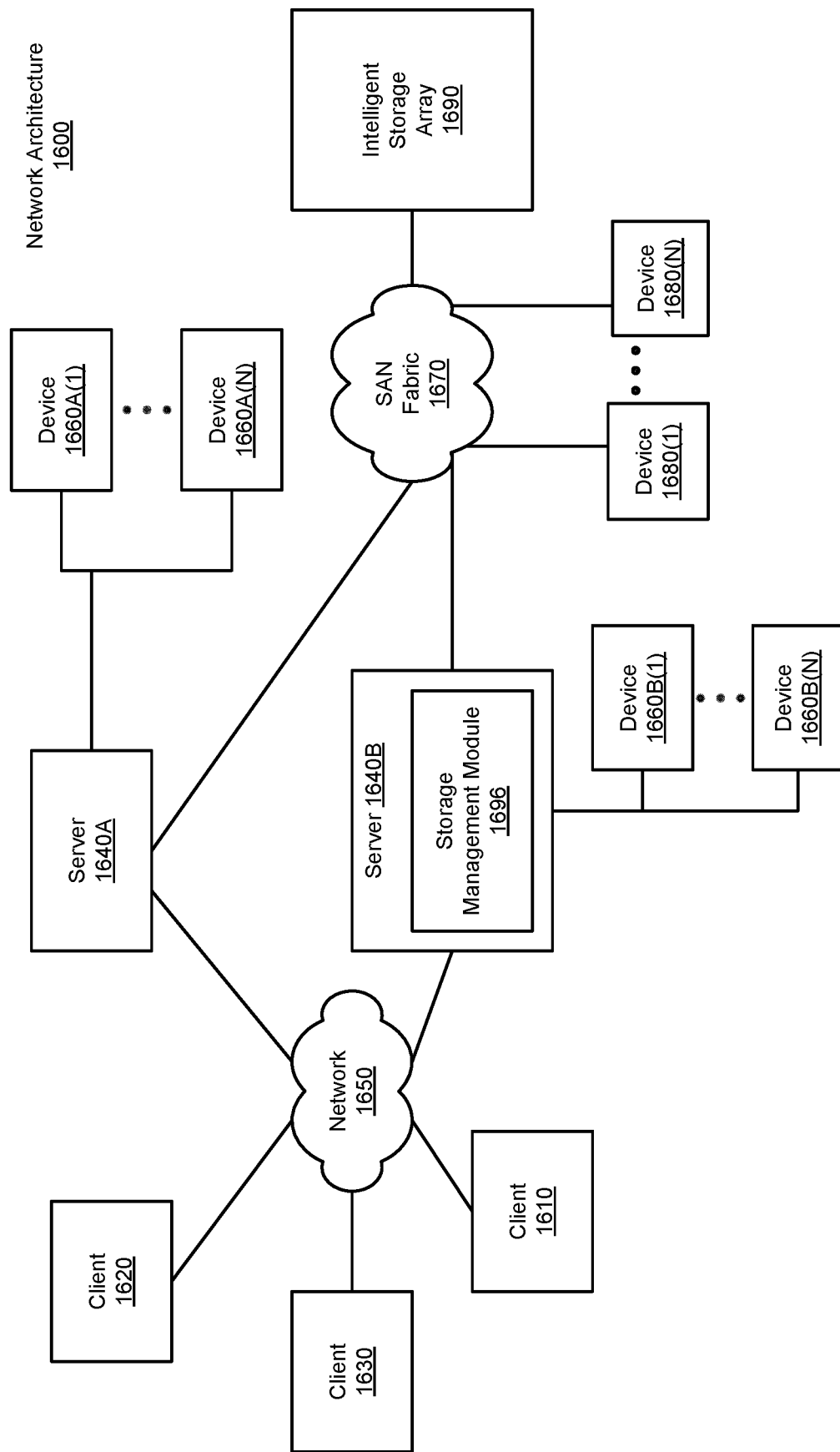
FIG. 16 is a simplified block diagram illustrating components of an example computer system suitable for implementing embodiments of the present disclosure, according to embodiments of methods and systems such as those disclosed herein.

FIG. 16 is a block diagram depicting a network architecture 1600 in which client systems 1610, 1620 and 1630, as well as storage servers 1640A and 1640B (any of which can be implemented using computer system 1610), are coupled to a network 1650. Storage server 1640A is further depicted as having storage devices 1660A(1)-(N) directly attached, and storage server 1640B is depicted with storage devices 1660B(1)-(N) directly attached. Storage servers 1640A and 1640B are also connected to a SAN fabric 1670, although connection to a storage area network is not required for operation. SAN fabric 1670 supports access to storage devices 1680(1)-(N) by storage servers 1640A and 1640B, and so by client systems 1610, 1620 and 1630 via network 1650. An intelligent storage array 1690 is also shown as an example of a specific storage device accessible via SAN fabric 1670.

Also depicted as part of network architecture 1600 is a storage management module 1696 (installed in server 1640B), which is comparable in function and operation to various of the storage management modules described earlier herein. For example, using the components depicted earlier, storage management module 1696 can provide functionality associated with the management of data, as depicted in and described in connection therewith.

With reference to computer system 1510, modem 1547, network interface 1548 or some other method can be used to provide connectivity from each of client computer systems 1610, 1620 and 1630 to network 1650. Client systems 1610, 1620 and 1630 are able to access information on storage server 1640A or 1640B using, for example, a web browser or other client software (not shown). Such a client allows client systems 1610, 1620 and 1630 to access data hosted by storage server 1640A or 1640B or one of storage devices 1660A(1)-(N), 1660B(1)-(N), 1680(1)-(N) or intelligent storage array 1690. FIG. 16 depicts the use of a network such as the Internet for exchanging data, but the systems described herein are not limited to the Internet or any particular network-based environment.

OTHER EMBODIMENTS

The example systems and computing devices described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

Such example systems and computing devices are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

The foregoing thus describes embodiments including components contained within other components (e.g., the various elements shown as components of computer system 1510). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. As such, the various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    determining whether a change in a status of data has occurred, wherein
        the data is stored in a storage system that comprises a plurality of storage units,
        the status is based, at least in part, on a characteristic of the data,
        metadata for the data is stored in a first storage unit of the plurality of storage units,
        the first storage unit is of one storage type,
        the one storage type is one of a first storage type of a plurality of storage types or a second storage type of the plurality of storage types,
        a storage unit of the first storage type comprises a first plurality of subunits of storage,
        the storage unit of the first storage type is configured to be copied in its entirety, as part of a backup operation,
        a unit of storage of the second storage type comprises a second plurality of subunits of storage, and
        the unit of storage of the second storage type is configured to be copied in its entirety, as part of the backup operation, and to permit copying of one or more of the second plurality of subunits of storage individually, as part of the backup operation; and
    in response to a determination that the change has occurred,
        determining whether a move condition has been met, and
        in response to a determination that the move condition has been met, moving the metadata from the first storage unit to a second storage unit, wherein
            the second storage unit is of another storage type,
            the another storage type is another of the first storage type or the second storage type, and
            the another storage type is one of the plurality of storage types other than the one storage type.

2. The method of claim 1, wherein the determining whether the move condition has been met comprises:
    determining whether the characteristic matches the move condition.

3. The method of claim 2, wherein the determining whether the characteristic matches the move condition comprises:
    determining whether the characteristic meets or exceeds one or more criteria.

4. The method of claim 2, wherein the determining whether the characteristic matches the move condition comprises:
    for each criteria of a plurality of criteria,
        determining whether a corresponding characteristic of a plurality of
            corresponding characteristics meets or exceeds the each criteria, wherein the plurality of corresponding characteristics comprises the characteristic; and
    in response to each of the plurality of corresponding characteristics matching a corresponding one of the plurality of criteria, performing the moving.

5. The method of claim 1, wherein
    the change in the status is a result of a data status event, and
    the data status event is at least one of
        a change in a frequency with which the data is accessed, or
        a change in size of the data.

6. The method of claim 5, wherein
    the data comprises a file, and
    the characteristic is an attribute of the file.

7. The method of claim 6, wherein
    the change is a result of at least one of
        a file creation operation,
        a file write operation, or
        a file deletion operation.

8. The method of claim 1, wherein the data comprises a file, and the method further comprises:
    retrieving the status from a file status cache.

9. The method of claim 8, further comprising:
    updating the status in the file status cache upon the change, wherein
        the change is a result of one or more operations comprising at least one of
            a file creation operation,
            a file write operation, or
            a file deletion operation, and
        the updating is performed by a daemon configured to scan the file status cache for one or more results of the one or more operations.

10. The method of claim 1, wherein
    the first storage type is a map volume, and
    the second storage type is a local volume.

11. The method of claim 10, wherein
    the data is stored in a data volume, and
    the data volume, the local volume, and the map volume are stored in a partition.

12. The method of claim 10, wherein
    the local volume is a loop volume,
    the status is stored in a file status cache, and
    the file status cache is stored in a header volume.

13. The method of claim 1, further comprising:
    performing a snapshot operation, wherein
        the snapshot operation comprises
            performing a volume copy operation on one or more storage units of the first storage type, and
            performing a file copy operation on one or more storage units of the second storage type.

14. The method of claim 1, further comprising:
    determining a size of a subunit of storage, wherein
        the subunit of storage is to be stored as part of the data,
        the subunit of storage is to be stored as part of the data,
            the subunit of storage is received at a storage system, and
        the storage system comprises
            the first storage unit, and
            the second storage unit;
    comparing the size of the subunit of storage and a size threshold;
    in response to a result of the comparing indicating metadata associated with the subunit of storage should be stored in a storage unit of the first storage type,
        selecting the unit of storage of the first storage type, and
        performing the moving from a storage unit of the first storage type to a storage unit of the second storage type; and
    in response to the result of the comparing indicating the metadata associated with the subunit of storage should be stored in a storage unit of the second storage type,
        selecting the unit of storage of the second storage type, and
        performing the moving from a storage unit of the second storage type to a storage unit of the first storage type.

15. The method of claim 14, further comprising:
    determining an access frequency of another subunit of storage, wherein
        the another subunit of storage is comprised in the data;
    comparing the access frequency and an access frequency threshold; and
    in response to the comparing the access frequency and the access frequency threshold indicating that the moving should be performed, performing the moving.

16. A non-transitory computer-readable storage medium, comprising program instructions, which, when executed by one or more processors of a computing system, perform a method comprising:
    determining whether a change in a status of data has occurred, wherein
        the data is stored in a storage system that comprises a plurality of storage units,
        the status is based, at least in part, on a characteristic of the data,
        metadata for the data is stored in a first storage unit of the plurality of storage units,
        the first storage unit is of one storage type,
        the one storage type is one of a first storage type of a plurality of storage types or a second storage type of the plurality of storage types,
        a storage unit of the first storage type comprises a first plurality of subunits of storage,
        the storage unit of the first storage type is configured to be copied in its entirety, as part of a backup operation,
        a unit of storage of the second storage type comprises a second plurality of subunits of storage, and
        the unit of storage of the second storage type is configured to be copied in its entirety, as part of the backup operation, and to permit copying of one or more of the second plurality of subunits of storage individually, as part of the backup operation; and
    in response to a determination that the change has occurred,
        determining whether a move condition has been met, and
        in response to a determination that the move condition has been met, moving the metadata from the first storage unit to a second storage unit, wherein
            the second storage unit is of another storage type,
            the another storage type is another of the first storage type or the second storage type, and
            the another storage type is one of the plurality of storage types other than the one storage type.

17. The non-transitory computer-readable storage medium of claim 16, wherein
    the change in the status is a result of a data status event, and
    the data status event is at least one of
        a change in a frequency with which the data is accessed, or
        a change in size of the data.

18. The non-transitory computer-readable storage medium of claim 16, wherein the data comprises a file, and the method further comprises:
    retrieving the status from a file status cache; and
    updating the status in the file status cache upon the change, wherein
        the change is a result of one or more operations comprising at least one of
            a file creation operation,
            a file write operation, or
            a file deletion operation, and
        the updating is performed by a daemon configured to scan the file status cache for one or more results of the one or more operations.

19. The non-transitory computer-readable storage medium of claim 16, wherein the method further comprises:
    performing a snapshot operation, wherein
        the snapshot operation comprises
            performing a volume copy operation on one or more storage units of the first storage type, and
            performing a file copy operation on one or more storage units of the second storage type.

20. A computing system comprising:
    one or more processors; and
    a non-transitory computer-readable storage medium coupled to the one or more
        processors, comprising program instructions, which, when executed by the one or more processors, perform a method comprising
        determining whether a change in a status of data has occurred, wherein
            the data is stored in a storage system that comprises a plurality of storage units,
            the status is based, at least in part, on a characteristic of the data,
            metadata for the data is stored in a first storage unit of the plurality of storage units,
            the first storage unit is of one storage type,
            the one storage type is one of a first storage type of a plurality of storage types or a second storage type of the plurality of storage types,
            a storage unit of the first storage type comprises a first plurality of subunits of storage,
            the storage unit of the first storage type is configured to be copied in its entirety, as part of a backup operation,
            a unit of storage of the second storage type comprises a second plurality of subunits of storage, and
            the unit of storage of the second storage type is configured to be copied in its entirety, as part of the backup operation, and to permit copying of one or more of the second plurality of subunits of storage individually, as part of the backup operation; and in response to a determination that the change has occurred,
   determining whether a move condition has been met, and
   in response to a determination that the move condition has been met, moving the metadata from the first storage unit to a second storage unit, wherein
      the second storage unit is of another storage type,
      the another storage type is another of the first storage type or the second storage type, and
      the another storage type is one of the plurality of storage types other than the one storage type.

* * * * *